US012739861B2

United States Patent

(12) United States Patent
Ko et al.

(10) Patent No.: US 12,739,861 B2
(45) Date of Patent: Sep. 15, 2026

(54) METHOD AND APPARATUS FOR CARRYING OUT PARTIAL SENSING ON BASIS OF TRANSMISSION PERIOD OF USER EQUIPMENT IN NR V2X

(71) Applicant: LG ELECTRONICS INC., Seoul (KR)

(72) Inventors: Woosuk Ko, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 302 days.

(21) Appl. No.: 18/558,333

(22) PCT Filed: May 6, 2022

(86) PCT No.: PCT/KR2022/006513
§ 371 (c)(1),
(2) Date: Oct. 31, 2023

(87) PCT Pub. No.: WO2022/235123
PCT Pub. Date: Nov. 10, 2022

(65) Prior Publication Data

US 2024/0244648 A1 Jul. 18, 2024

Related U.S. Application Data

(60) Provisional application No. 63/184,716, filed on May 5, 2021.

(30) Foreign Application Priority Data

May 26, 2021 (KR) ........................ 10-2021-0067320

(51) Int. Cl.
*H04W 72/40* (2023.01)
*H04W 72/25* (2023.01)
*H04W 72/541* (2023.01)

(52) U.S. Cl.
CPC ........... *H04W 72/40* (2023.01); *H04W 72/25* (2023.01); *H04W 72/541* (2023.01)

(58) Field of Classification Search
None
See application file for complete search history.

(56) References Cited

U.S. PATENT DOCUMENTS

2022/0312479 A1* 9/2022 Farag .................. H04W 72/542
2024/0015703 A1* 1/2024 Lin ...................... H04W 72/02

OTHER PUBLICATIONS

Apple, "Discussion on Sidelink Resource Allocation for Power Saving," 3GPP TSG RAN WG #104b-e, R1-2103121, e-Meeting, Apr. 12-20, 2021.*

(Continued)

*Primary Examiner* — Edemio Navas, Jr.
(74) *Attorney, Agent, or Firm* — LEE, HONG, DEGERMAN, KANG & WAIMEY

(57) ABSTRACT

Proposed is a method for operation of a first device (100) in a wireless communication system. The method may comprise the steps of: triggering resource selection; determining at least one candidate slot for periodic based partial sensing (PBPS) related to the resource selection; selecting a sidelink (SL) resource on the basis of a candidate resource set related to the at least one candidate slot; and transmitting, on the basis of the SL resource, sidelink control information (SCI) to a second device (200), wherein, on the basis of the PBPS related to a transmission period of an MAC PDU, having not been completed, the SCI does not include information related to a reservation period of the MAC PDU.

15 Claims, 17 Drawing Sheets

(56) References Cited

OTHER PUBLICATIONS

European Patent Office Application Serial No. 22799166.8, Search Report dated Apr. 7, 2025, 10 pages.

Apple, "Discussion on Sidelink Resource Allocation for Power Saving," 3GPP TSG RAN WG1 #104b-e, R1-2103121, Apr. 2021, 13 pages.

Futurewei, "Power consumption reduction for sidelink resource allocation," 3GPP TSG RAN WG1 Meeting #104-bis-e, R1-2102780, Apr. 2021, 9 pages.

Oppo, "FL summary for AI 8.11.1.1—resource allocation for power saving (3rd check point)," 3GPP TSG RAN WG1 #104b-e, R1-2104092, Apr. 2021, 120 pages.

* cited by examiner

FIG. 2

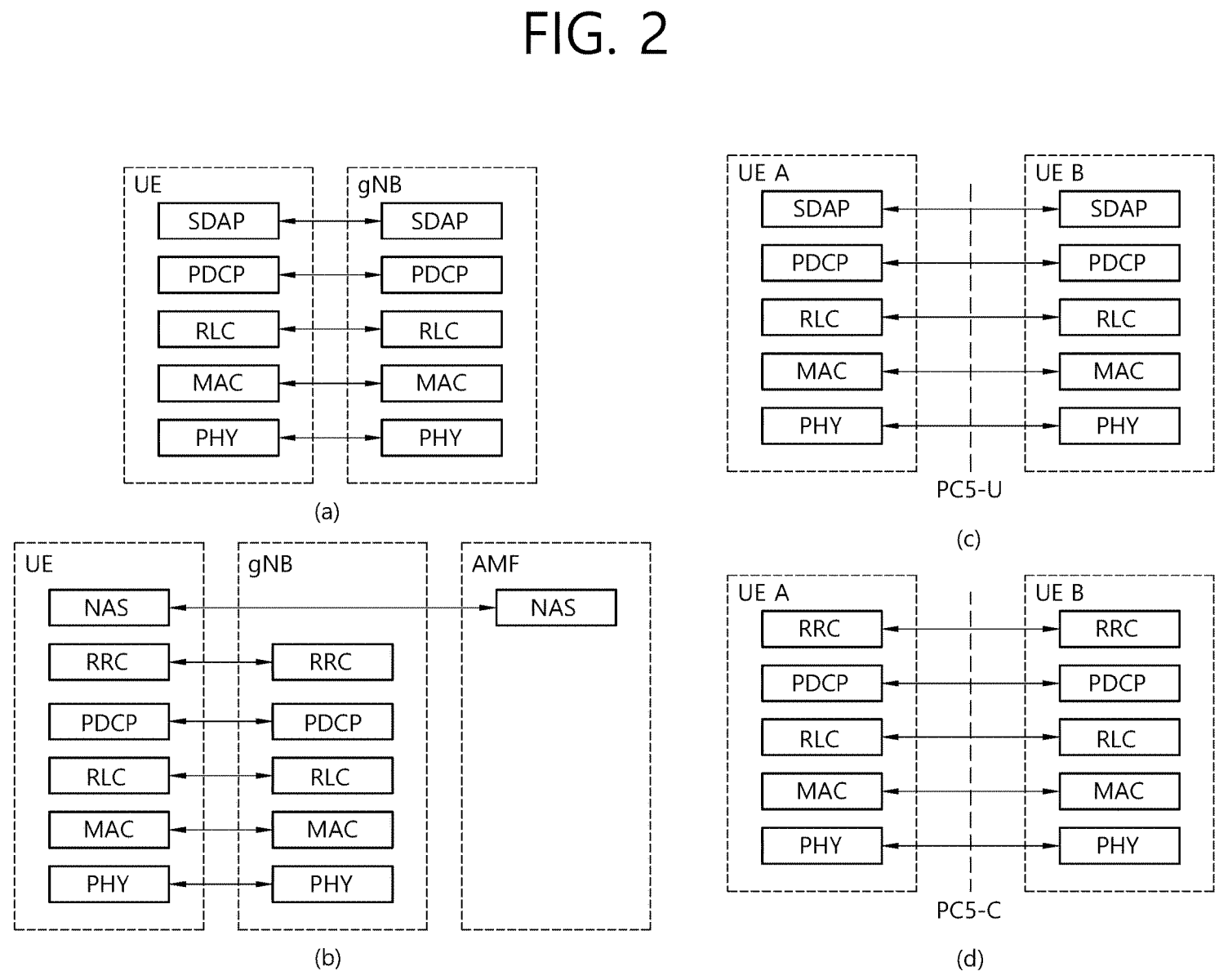

UE
SDAP
PDCP
RLC
MAC
PHY gNB
SDAP
PDCP
RLC
MAC
PHY (a)

UE
NAS
RRC
PDCP
RLC
MAC
PHY gNB
RRC
PDCP
RLC
MAC
PHY

AMF
NAS (b)

UE A
SDAP
PDCP
RLC
MAC
PHY

UE B
SDAP
PDCP
RLC
MAC
PHY

PC5-U (c)

UE A
RRC
PDCP
RLC
MAC
PHY

UE B
RRC
PDCP
RLC
MAC
PHY

PC5-C (d)

Time
Freq.
P1
P1
P2
P2
P2
P2
slot #Y1
selection window
: certain slot among Y candidate slots
: slots subject to sensing receiving, from a first device, SCI for transmitting a MAC PDU based on an SL resource

Figure 20:
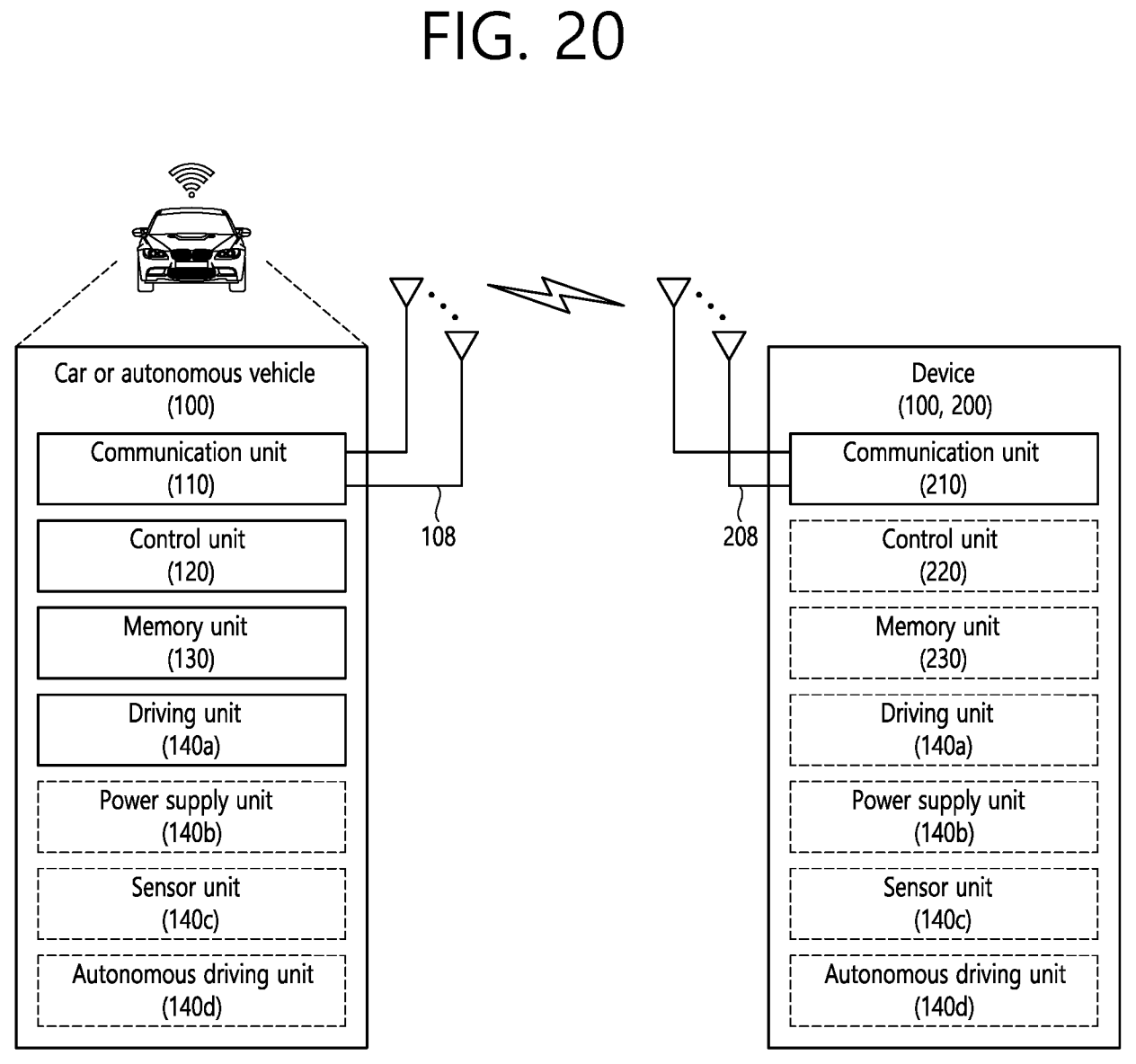

Car or autonomous vehicle
(100)

Communication unit
(110)

Control unit
(120)

Memory unit
(130)

Driving unit
(140a)

Power supply unit
(140b)

Sensor unit
(140c)

Autonomous driving unit
(140d)

108

208

Device
(100, 200)

Communication unit
(210)

Control unit
(220)

Memory unit
(230)

Driving unit
(140a)

Power supply unit
(140b)

Sensor unit
(140c)

Autonomous driving unit
(140d)

METHOD AND APPARATUS FOR CARRYING OUT PARTIAL SENSING ON BASIS OF TRANSMISSION PERIOD OF USER EQUIPMENT IN NR V2X

CROSS-REFERENCE TO RELATED APPLICATIONS

This application is the National Stage filing under 35 U.S.C. 371 of International Application No. PCT/KR2022/006513, filed on May 6, 2022, which claims the benefit of earlier filing date and right of priority to Korean Application No. 10-2021-0067320, filed on May 26, 2021, and also claims the benefit of U.S. Provisional Application No. 63/184,716, filed on May 5, 2021, the contents of which are all hereby incorporated by reference herein in their entireties.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

According to an embodiment of the present disclosure, a method for performing, by a first device, wireless communication may be proposed. For example, the method may comprise: performing synchronization with a synchronization source: obtaining information related to a resource pool: triggering resource selection for a physical sidelink control channel (PSCCH) resource or a physical sidelink shared channel (PSSCH) resource for transmitting a medium access control (MAC) protocol data unit (PDU), within the resource pool: determining at least one candidate slot for periodic based partial sensing (PBPS) related to the resource selection: selecting a sidelink (SL) resource, based on a candidate resource set related to the at least one candidate slot: and transmitting, to a second device, sidelink control information (SCI) based on the SL resource, wherein the SCI may not include information related to a reservation period of the MAC PDU, based on the PBPS related to a transmission period of the MAC PDU being not completed.

According to an embodiment of the present disclosure, a first device for performing wireless communication may be proposed. For example, the first device may comprise: one or more memories storing instructions: one or more transceivers: and one or more processors connected to the one or more memories and the one or more transceivers. For example, the one or more processors may execute the instructions to: perform synchronization with a synchronization source: obtain information related to a resource pool: trigger resource selection for a physical sidelink control channel (PSCCH) resource or a physical sidelink shared channel (PSSCH) resource for transmitting a medium access control (MAC) protocol data unit (PDU), within the resource pool: determine at least one candidate slot for periodic based partial sensing (PBPS) related to the resource selection: select a sidelink (SL) resource, based on a candidate resource set related to the at least one candidate slot: and transmit, to a second device, sidelink control information (SCI) based on the SL resource, wherein the SCI may not include information related to a reservation period of the MAC PDU, based on the PBPS related to a transmission period of the MAC PDU being not completed.

According to an embodiment of the present disclosure, a device adapted to control a first user equipment (UE) may be proposed. For example, the device may comprise: one or more processors: and one or more memories operably connectable to the one or more processors and storing instructions. For example, the one or more processors may execute the instructions to: perform synchronization with a synchronization source: obtain information related to a resource pool: trigger resource selection for a physical sidelink control channel (PSCCH) resource or a physical sidelink shared channel (PSSCH) resource for transmitting a medium access control (MAC) protocol data unit (PDU), within the resource pool: determine at least one candidate slot for periodic based partial sensing (PBPS) related to the resource selection: select a sidelink (SL) resource, based on a candidate resource set related to the at least one candidate slot: and transmit, to a second UE, sidelink control information (SCI) based on the SL resource, wherein the SCI may not include information related to a reservation period of the MAC PDU, based on the PBPS related to a transmission period of the MAC PDU being not completed.

According to an embodiment of the present disclosure, a non-transitory computer-readable storage medium storing instructions may be proposed. For example, the instructions, when executed, may cause a first device to: perform synchronization with a synchronization source: obtain information related to a resource pool: trigger resource selection for a physical sidelink control channel (PSCCH) resource or a physical sidelink shared channel (PSSCH) resource for transmitting a medium access control (MAC) protocol data unit (PDU), within the resource pool: determine at least one candidate slot for periodic based partial sensing (PBPS) related to the resource selection: select a sidelink (SL) resource, based on a candidate resource set related to the at least one candidate slot: and transmit, to a second device, sidelink control information (SCI) based on the SL resource, wherein the SCI may not include information related to a reservation period of the MAC PDU, based on the PBPS related to a transmission period of the MAC PDU being not completed.

According to an embodiment of the present disclosure, a method for performing, by a second device, wireless communication may be proposed. For example, the method may comprise: receiving, from a first device, sidelink control information (SCI) for transmitting a medium access control (MAC) protocol data unit (PDU) based on a sidelink (SL) resource, wherein the SL resource may be selected based on a candidate resource set related to at least one candidate slot, wherein the at least one candidate slot may be at least one slot related to periodic based partial sensing (PBPS), and wherein the SCI may not include information related to a reservation period of the MAC PDU, based on the PBPS related to a transmission period of the MAC PDU being not completed.

According to an embodiment of the present disclosure, a second device for performing wireless communication may be proposed. For example, the second device may comprise: one or more memories storing instructions: one or more transceivers: and one or more processors connected to the one or more memories and the one or more transceivers. For example, the one or more processors may execute the instructions to: receive, from a first device, sidelink control information (SCI) for transmitting a medium access control (MAC) protocol data unit (PDU) based on a sidelink (SL) resource, wherein the SL resource may be selected based on a candidate resource set related to at least one candidate slot, wherein the at least one candidate slot may be at least one slot related to periodic based partial sensing (PBPS), and wherein the SCI may not include information related to a reservation period of the MAC PDU, based on the PBPS related to a transmission period of the MAC PDU being not completed.

The user equipment (UE) may efficiently perform retransmission based on hybrid automatic repeat request (HARQ) feedback.

BRIEF DESCRIPTION OF THE DRAWINGS

FIG. 2 shows a radio protocol architecture, based on an embodiment of the present disclosure.

FIG. 20 shows a vehicle or an autonomous vehicle, based on an embodiment of the present disclosure.

DETAILED DESCRIPTION

Figure 1:
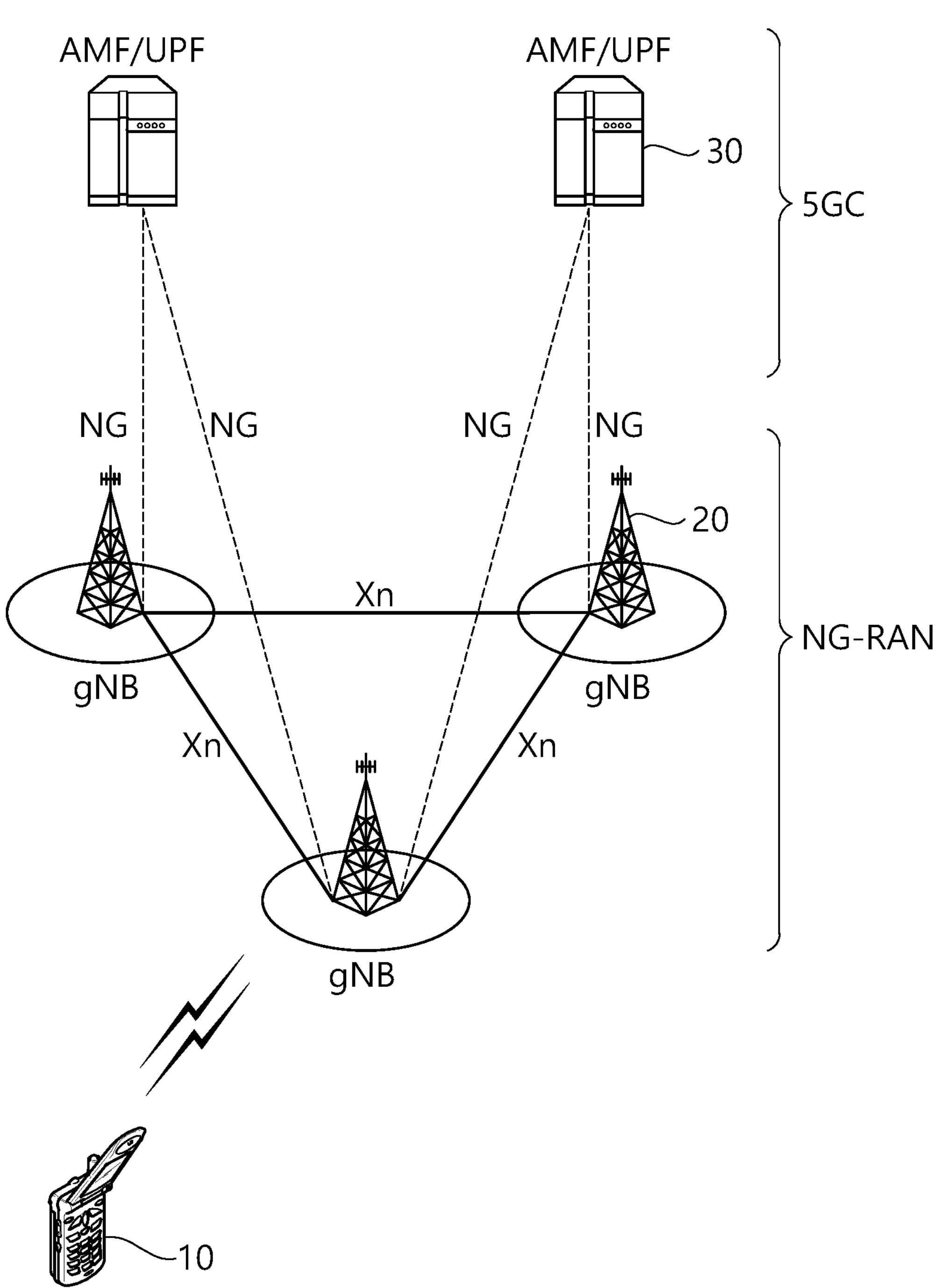
FIG. 1 shows a structure of an NR system, based on an embodiment of the present disclosure.

In the present disclosure, “A or B” may mean “only A”, “only B” or “both A and B.” In other words, in the present disclosure, “A or B” may be interpreted as “A and/or B”. For example, in the present disclosure, “A, B, or C” may mean “only A”, “only B”, “only C”, or “any combination of A, B, C”.

A slash (/) or comma used in the present disclosure may mean “and/or”. For example, “A/B” may mean “A and/or B”. Accordingly, “A/B” may mean “only A”, “only B”, or “both A and B”. For example, “A, B, C” may mean “A, B, or C”.

In the present disclosure, “at least one of A and B” may mean “only A”, “only B”, or “both A and B”. In addition, in the present disclosure, the expression “at least one of A or B” or “at least one of A and/or B” may be interpreted as “at least one of A and B”.

In addition, in the present disclosure, “at least one of A, B, and C” may mean “only A”, “only B”, “only C”, or “any combination of A, B, and C”. In addition, “at least one of A, B, or C” or “at least one of A, B, and/or C” may mean “at least one of A, B, and C”.

In addition, a parenthesis used in the present disclosure may mean “for example”. Specifically, when indicated as “control information (PDCCH)”, it may mean that “PDCCH” is proposed as an example of the “control information”. In other words, the “control information” of the present disclosure is not limited to “PDCCH”, and “PDDCH” may be proposed as an example of the “control information”. In addition, when indicated as “control information (i.e., PDCCH)”, it may also mean that “PDCCH” is proposed as an example of the “control information”.

In the following description, ‘when, if, or in case of’ may be replaced with ‘based on’.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHZ, middle frequency bands ranging from 1 GHZ to 10 GHz, high frequency (millimeter waves) of 24 GHZ or more, and so on.

For clarity in the description, the following description will mostly focus on LTE-A or 5G NR. However, technical features according to an embodiment of the present disclosure will not be limited only to this.

For terms and techniques not specifically described among terms and techniques used in this specification, a wireless communication standard document published before the present specification is filed may be referred to.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides a higher layer with an information transfer service through a physical channel. The physical layer is connected to a medium access control (MAC) layer which is a higher layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QOS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QOS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types. i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
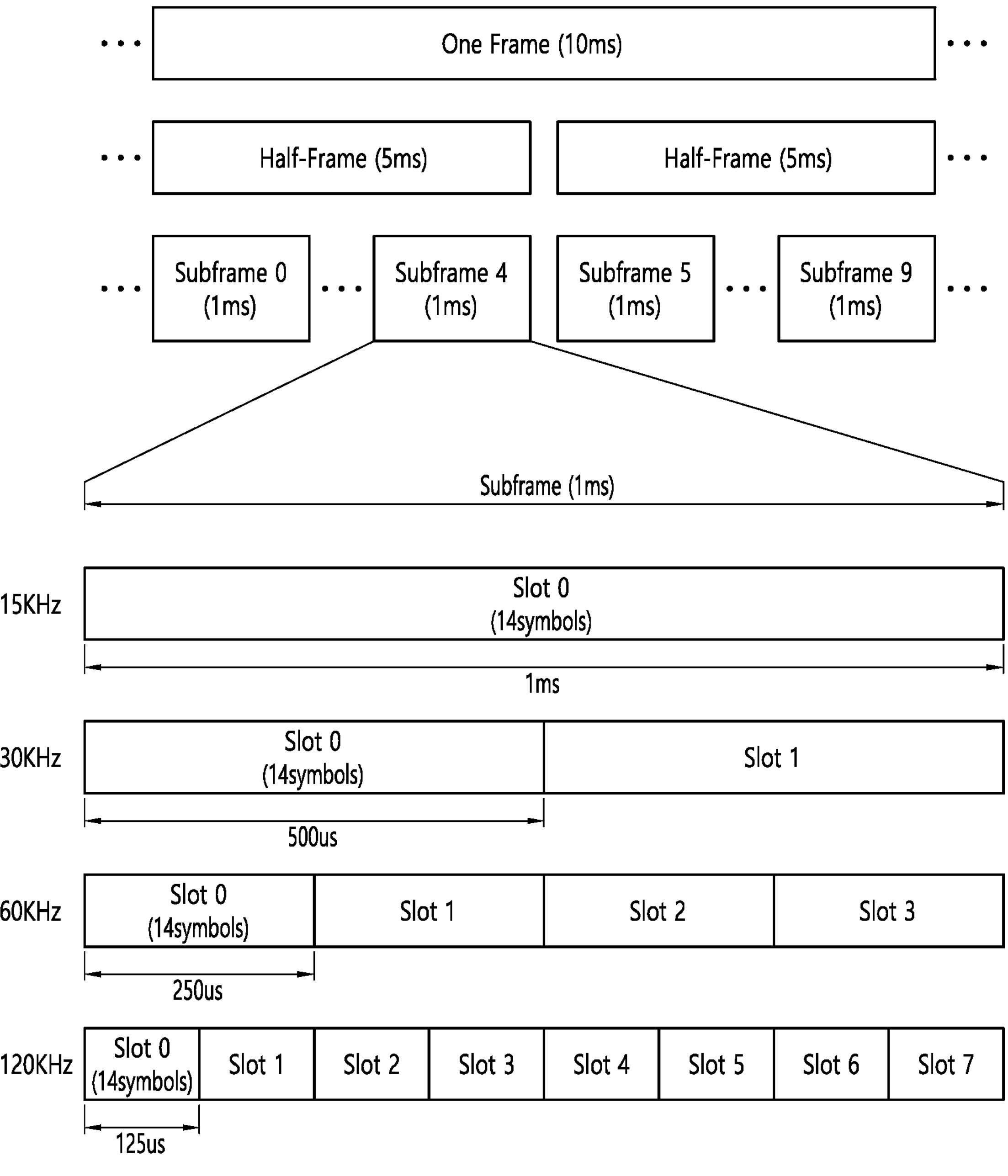
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five Ims subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N_{symb}^{slot}$ | $N_{slot}^{frame, u}$ | $N_{slot}^{subframe, u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N_{symb}^{slot}$ | $N_{slot}^{frame, u}$ | $N_{slot}^{subframe, u}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 KHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a “sub 6 GHz range”, and FR2 may mean an “above 6 GHz range” and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
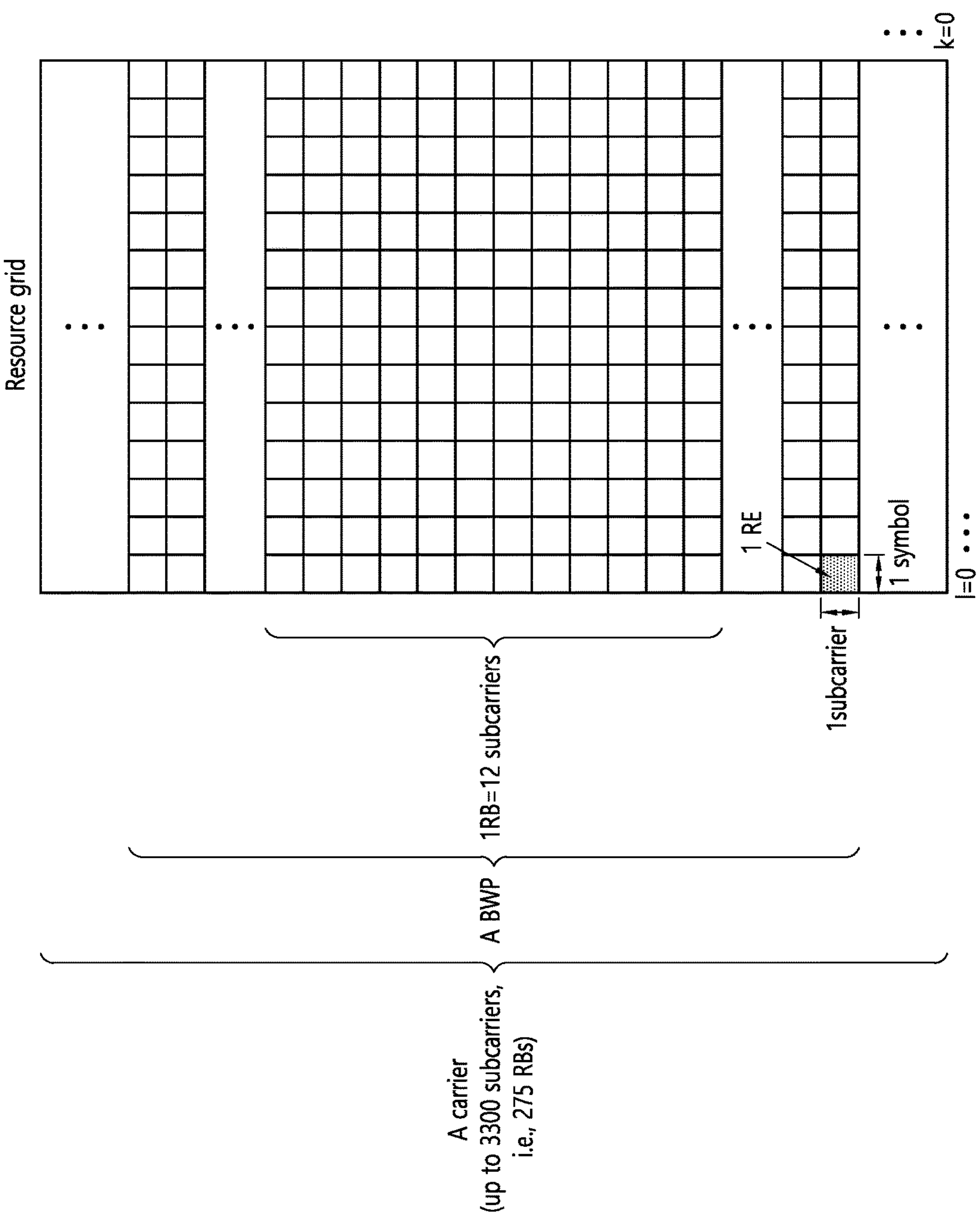
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
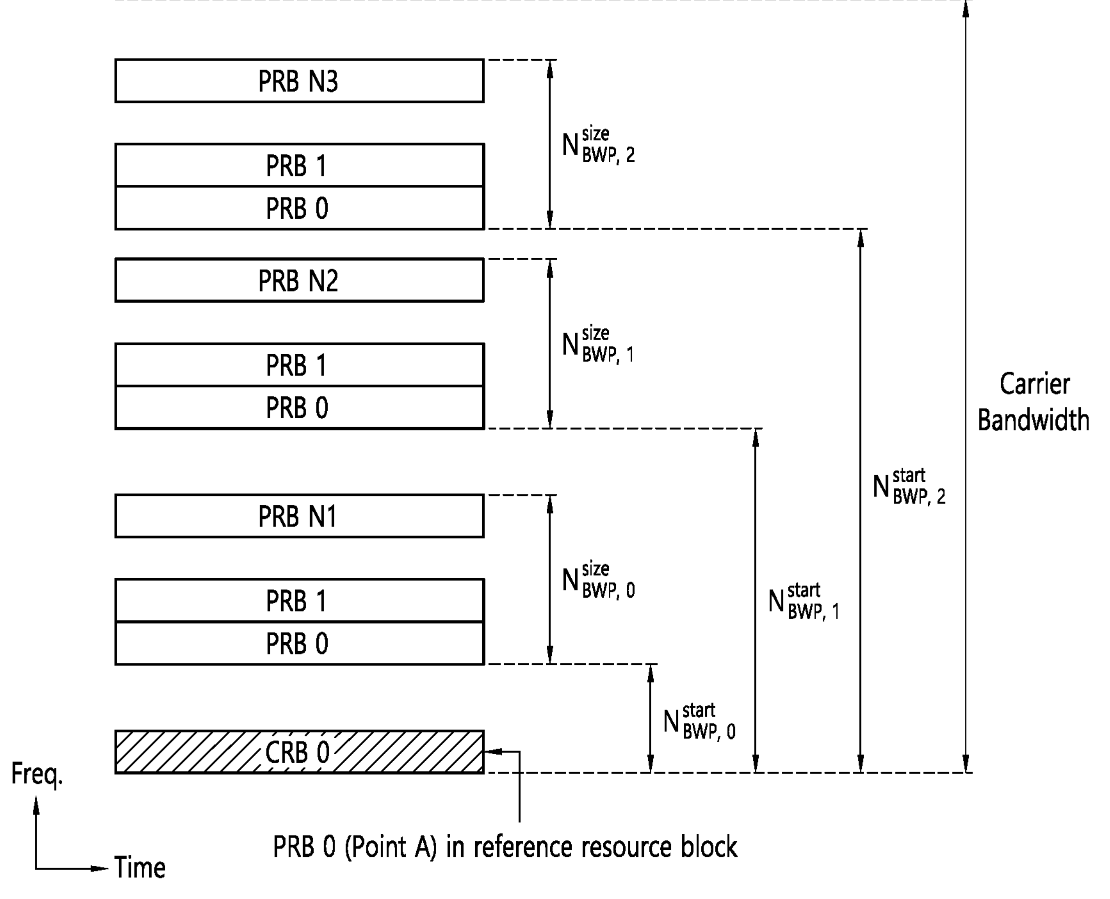
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset NstartBWP from the point A. and a bandwidth NsizeBWP. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
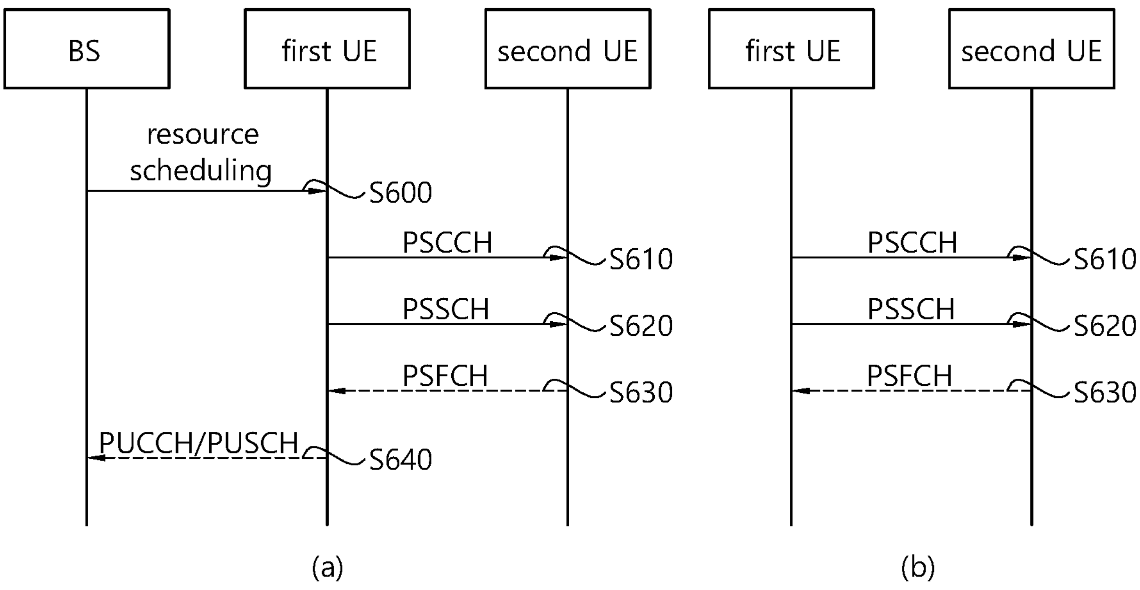
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or 1st-stage SCI) to a second UE based on the resource scheduling. In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or 1st-stage SCI) to a second UE by using the resource(s). In step S620, the first UE may transmit a PSSCH (e.g., 2nd-stage SCI. MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a 1st SCI, a first SCI, a 1st-stage SCI or a 1st-stage SCI format, and a SCI transmitted through a PSSCH may be referred to as a 2nd SCI, a second SCI, a 2nd-stage SCI or a 2nd-stage SCI format. For example, the 1st-stage SCI format may include a SCI format 1-A. and the 2nd-stage SCI format may include a SCI format 2-A and/or a SCI format 2-B.

Hereinafter, an example of SCI format 1-A will be described.

SCI format 1-A is used for the scheduling of PSSCH and 2nd-stage-SCI on PSSCH.

The following information is transmitted by means of the SCI format 1-A:

Priority—3 bits

Frequency resource assignment—ceiling ($\log_2(N^{SL}_{subChannel}(N^{SL}_{subChannel}+1)/2)$) bits when the value of the higher layer parameter sl-MaxNumPerReserve is configured to 2; otherwise ceiling $\log_2(N^{SL}_{subChannel}(N^{SL}_{subChannel}+1)(2N^{SL}_{subChannel}+1)/6)$ bits when the value of the higher layer parameter sl-MaxNumPerReserve is configured to 3

Time resource assignment—5 bits when the value of the higher layer parameter sl-MaxNumPerReserve is configured to 2: otherwise 9 bits when the value of the higher layer parameter sl-MaxNumPerReserve is configured to 3

Resource reservation period—ceiling ($\log_2 N_{rsv\_period}$) bits, where $N_{rsv\_period}$ is the number of entries in the higher layer parameter sl-ResourceReservePeriodList, if higher layer parameter sl-MultiReserveResource is configured; 0 bit otherwise DMRS pattern—ceiling ($\log_2 N_{pattern}$) bits, where $N_{pattern}$ is the number of DMRS patterns configured by higher layer parameter sl-PSSCH-DMRS-TimePatternList $2^{nd}$-stage SCI format—2 bits as defined in Table 5

Beta_offset indicator—2 bits as provided by higher layer parameter sl-BetaOffsets2ndSCI Number of DMRS port—1 bit as defined in Table 6

Modulation and coding scheme—5 bits

Additional MCS table indicator—1 bit if one MCS table is configured by higher layer parameter sl-Additional-MCS-Table: 2 bits if two MCS tables are configured by higher layer parameter sl-Additional-MCS-Table: 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits, with value set to zero.

TABLE 5

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 6

| Value of the Number of DMRS port field | Antenna ports |
|---|---|
| 0 | 1000 |
| 1 | 1000 and 1001 |

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits

New data indicator—1 bit

Redundancy version—2 bits

Source ID—8 bits

Destination ID—16 bits

HARQ feedback enabled/disabled indicator—1 bit

Cast type indicator—2 bits as defined in Table 7

CSI request—1 bit

TABLE 7

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described.

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits

New data indicator—1 bit

Redundancy version—2 bits

Source ID—8 bits

Destination ID—16 bits

HARQ feedback enabled/disabled indicator—1 bit

Zone ID—12 bits

Communication range requirement—4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Hereinafter, a UE procedure for determining a subset of resources to be reported to a higher layer in PSSCH resource selection in sidelink resource allocation mode 2 will be described.

In resource allocation mode 2, a higher layer may request a UE to determine a subset of resources, from which the higher layer will select a resource for PSSCH/PSCCH transmission. To trigger this procedure, in slot n, a higher layer provides the following parameters for a PSSCH/PSCCH transmission.

the resource pool from which the resources are to be reported:

L1 priority, $prio_{TX}$;

the remaining packet delay budget;

the number of sub-channels to be used for the PSSCH/PSCCH transmission in a slot, $L_{subCH}$;

optionally, the resource reservation interval, $P_{rsvp\_TX}$, in units of msec.

if the higher layer requests the UE to determine a subset of resources from which the higher layer will select resources for PSSCH/PSCCH transmission as part of re-evaluation or pre-emption procedure, the higher layer provides a set of resources ($r_0, r_1, r_2, \ldots$) which may be subject to re-evaluation and a set of resources $$(r'_0, r'_1, r'_2, \ldots)$$

which may be subject to pre-emption.

it is up to UE implementation to determine the subset of resources as requested by higher layers before or after the slot $$r''_i - T_3,$$

where $$r''_i$$

is the slot with the smallest slot index among ($r_0$, $r_1$, $r_2$, . . . ) and $$(r'_0, r'_1, r'_2, \ldots),$$

and $T_3$ is equal to $$T^{SL}_{proc,1},$$

where $$T^{SL}_{proc,1},$$

is defined in slots in Table X1, where $\mu_{SL}$ is the SCS configuration of the SL BWP.

Following higher layer parameters affect this procedure:

sl-SelectionWindowList: internal parameter $T_{2min}$ is set to the corresponding value from higher layer parameter sl-SelectionWindowList for the given value of $prio_{TX}$.

sl-Thres-RSRP-List: this higher layer parameter provides an RSRP threshold for each combination ($p_i$, $p_j$), where $p_i$ is the value of the priority field in a received SCI format 1-A and $p_j$ is the priority of the transmission of the UE selecting resources; for a given invocation of this procedure, $p_j$=$prio_{TX}$.

sl-RS-ForSensing selects if the UE uses the PSSCH-RSRP or PSCCH-RSRP measurement.

sl-ResourceReservePeriodList sl-SensingWindow: internal parameter $T_0$ is defined as the number of slots corresponding to sl-SensingWindow msec sl-TxPercentageList: internal parameter X for a given $prio_{TX}$ is defined as sl-TxPercentageList ($prio_{TX}$) converted from percentage to ratio sl-PreemptionEnable: if sl-PreemptionEnable is provided, and if it is not equal to 'enabled', internal parameter $prio_{pre}$ is set to the higher layer provided parameter sl-PreemptionEnable.

The resource reservation interval, $P_{rsvp\_TX}$, if provided, is converted from units of msec to units of logical slots, resulting in $$P'_{rsvp\_TX}.$$

Notation:

$$\left(t'^{SL}_0, t'^{SL}_1, t'^{SL}_2, \ldots\right)$$

denotes the set of slots which belongs to the sidelink resource pool.

For example, a UE may select a set of candidate resources ($S_A$) based on Table 8. For example, when resource (re) selection is triggered, a UE may select a set of candidate resources ($S_A$) based on Table 8. For example, when re-evaluation or pre-emption is triggered, a UE may select a set of candidate resources ($S_A$) based on Table 8.

TABLE 8

The following steps are used:

1) A candidate single-slot resource for transmission $R_{x,y}$ is defined as a set of $L_{subCH}$ contiguous sub-channels with sub-channel x+j in slot $t'^{SL}_y$ where j = 0, . . . , $L_{subCH}$ −

1. The UE shall assume that any set of $L_{subCH}$ contiguous sub-channels included in the corresponding resource pool within the time interval [n + $T_1$, n + $T_2$] correspond to one candidate single-slot resource, where selection of $T_1$ is up to UE implementation under $0 \le T_1 \le T^{SL}_{proc,1}$, where $T^{SL}_{proc,1}$ is defined in slots in Table 8.1.4-2 where $\mu_{SL}$ is the SCS configuration of the SL BWP;

if $T_{2min}$ is shorter than the remaining packet delay budget (in slots) then $T_2$ is up to UE implementation subject to $T_{2min} \le T_2 \le$ remaining packet delay budget (in slots); otherwise $T_2$ is set to the remaining packet delay budget (in slots).

The total number of candidate single-slot resources is denoted by $M_{total}$.

2) The sensing window is defined by the range of slots $\left[n - T_0, n - T^{SL}_{proc,0}\right)$ where $T_0$ is defined above and $T^{SL}_{proc,0}$ is defined in slots in Table 8.1.4-1 where $\mu_{SL}$ is the SCS configuration of the SL BWP. The UE shall monitor slots which belongs to a sidelink resource pool within the sensing window except for those in which its own transmissions occur. The UE shall perform the behaviour in the following steps based on PSCCH decoded and RSRP measured in these slots.

3) The internal parameter Th($p_i$, $p_j$) is set to the corresponding value of RSRP threshold indicated by the i-th field in sl-Thres-RSRP-List, where i = $p_i$ + ($p_j$ − 1) * 8.

4) The set $S_A$ is initialized to the set of all the candidate single-slot resources.

5) The UE shall exclude any candidate single-slot resource $R_{x,y}$ from the set $S_A$ if it meets all the following conditions:

TABLE 8-continued the UE has not monitored slot $t'^{SL}_m$ in Step 2.

for any periodicity value allowed by the higher layer parameter sl-ResourceReservePeriodList and a hypothetical SCI format 1-A received in slot $t'^{SL}_m$ with 'Resource reservation period' field set to that periodicity value and indicating all subchannels of the resource pool in this slot, condition c in step 6 would be met.

5a) If the number of candidate single-slot resources $R_{x,y}$ remaining in the set $S_A$ is smaller than $X \cdot M_{total}$, the set $S_A$ is initialized to the set of all the candidate single-slot resources as in step 4.

6) The UE shall exclude any candidate single-slot resource $R_{x,y}$ from the set $S_A$ if it meets all the following conditions:

a) the UE receives an SCI format 1-A in slot $t'^{SL}_m$, and 'Resource reservation period' field, if present, and 'Priority' field in the received SCI format 1-A indicate the values $P_{rsvp\_RX}$ and $prio_{RX}$, respectively according to Clause 16.4 in [6, TS 38.213];

b) the RSRP measurement performed, according to clause 8.4.2.1 for the received SCI format 1-A, is higher than $Th(prio_{RX}, prio_{TX})$;

c) the SCI format received in slot $t'^{SL}_m$ or the scam SCI format which, if and only if the 'Resource reservation period' field is present in the received SCI format 1-A, is assumed to be received in slot(s) $t'^{SL}_{m+q\times P'_{rsvp\_RX}}$ determines according to clause 8.1.5 the set of resource blocks and slots which overlaps with $R_{x,y+j\times P'_{rsvp\_TX}}$ for q = 1, 2, . . . , Q and j = 0, 1, . . . , $C_{resel} - 1$. Here, $P'_{rsvp\_RX}$ is $P_{rsvp\_RX}$ converted to units of logical slots according to clause 8.1.7, $Q = \left\lceil \frac{T_{scal}}{P_{rsvp\_RX}} \right\rceil$ if $P_{rsvp\_RX} <$ $T_{scal}$ and $n' - m \le P'_{rsvp\_RX}$, where $t'^{SL}_{n'} = n$ if slot n belongs to the set $\left(t'^{SL}_0, t'^{SL}_1, \ldots, t'^{SL}_{T'_{max}-1}\right)$, otherwise slot $t'^{SL}_{n'}$ is the first slot after slot n belonging to the set $\left(t'^{SL}_0, t'^{SL}_1, \ldots, t'^{SL}_{T'_{max}-1}\right)$; otherwise Q = 1. $T_{scal}$ is set to selection window size $T_2$ converted to units of msec.

7) If the number of candidate single-slot resources remaining in the set $S_A$ is smaller than $X \cdot M_{total}$, then $Th(p_i, p_j)$ is increased by 3 dB for each priority value $Th(p_i, p_j)$ and the procedure continues with step 4.

The UE shall report set $S_A$ to higher layers.

If a resource $r_i$ from the set $(r_0, r_1, r_2, \ldots)$ is not a member of $S_A$, then the UE shall report re-evaluation of the resource $r_i$ to higher layers.

If a resource $r'_i$ from the set $(r'_0, r'_1, r'_2, \ldots)$ meets the conditions below then the UE shall report pre-emption of the resource $r'_i$ to higher layers $r'_i$ is not a member of $S_A$, and $r'_i$ meets the conditions for exclusion in step 6, with $Th(prio_{RX}, prio_{TX})$ set to the final threshold after executing steps 1)-7), i.e. including all necessary increments for reaching $X \cdot M_{total}$, and the associated priority $prio_{RX}$, satisfies one of the following conditions:

sl-PreemptionEnable is provided and is equal to 'enabled' and $prio_{TX} > prio_{RX}$ sl-PreemptionEnable is provided and is not equal to 'enabled', and $prio_{RX} < prio_{pre}$ and $prio_{TX} > prio_{RX}$ On the other hand, partial sensing may be supported for power saving of a UE. For example, in LTE SL or LTE V2X, a UE may perform partial sensing.

Figure 7:
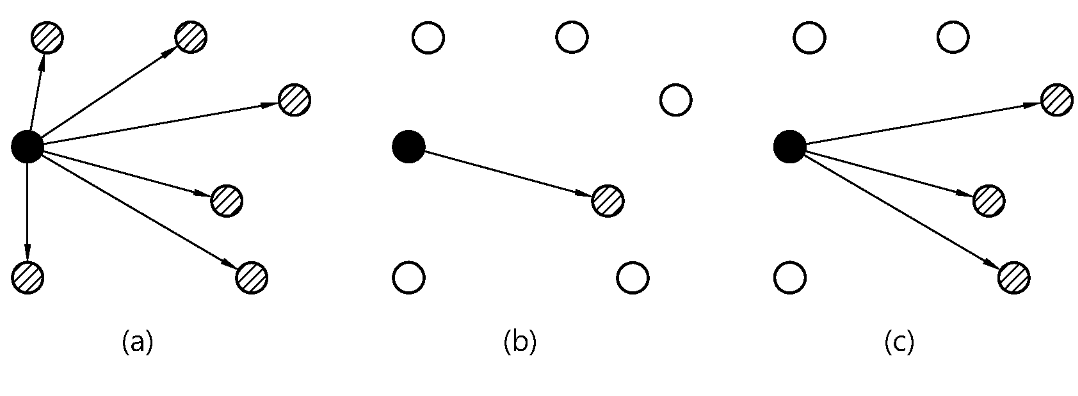
FIG. 7 shows three cast types, based on an embodiment of the present disclosure.

FIG. 7 shows three types of casts according to an embodiment of the present disclosure. The embodiment of FIG. 7 may be combined with various embodiments of the present disclosure. Specifically, FIG. 7(*a*) shows broadcast type SL communication, FIG. 7(*b*) shows unicast type SL communication, and FIG. 7(*c*) shows groupcast type SL communication. In the case of unicast type SL communication, a UE may perform one-to-one communication with another UE. In the case of groupcast type SL communication, a UE may perform SL communication with one or more UEs in a group to which the UE belongs. In various embodiments of the present disclosure, SL groupcast communication may be replaced with SL multicast communication, SL one-to-many communication, or the like.

In this disclosure, the wordings "set or define" may be interpreted as being (pre)configured by a base station or network (via predefined signaling (e.g., SIB signaling, MAC signaling, RRC signaling). For example, "A may be set" may include "a base station or network (pre)sets/defines or informs a UE of A". Alternatively, the word "set or define" may be interpreted as being preset or predefined by the system. For example, "A may be set" may include "A is preset/predefined by the system".

Referring to the standard document, some procedures and technical specifications related to the present disclosure are as follows.

TABLE 9

| 3GPP TS 36.213 V16.2.0 |
|---|
| 14.1.1.6 UE procedure for determining the subset of resources to be reported to higher layers in PSSCH resource selection in sidelink transmission mode 4 and in sensing measurement in sidelink transmission mode 3 |
| In sidelink transmission mode 4, when requested by higher layers in subframe n for a carrier, the UE shall determine the set of resources to be reported to higher layers for PSSCH transmission according to the steps described in this Subclause. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers (described in [8]). $C_{resel}$ is determined according to Subclause 14.1.1.4B. |
| In sidelink transmission mode 3, when requested by higher layers in subframe n for a carrier, the UE shall determine the set of resources to be reported to higher layers in sensing measurement according to the steps described in this Subclause. Parameters $L_{subCh}$ $P_{rsvp\_TX}$ and $prio_{TX}$ are all provided by higher layers (described in [11]). $C_{resel}$ is determined by $C_{resel}$ = 10 * SL_RESOURCE_RESELECTION_COUNTER, where SL_RESOURCE_RESELECTION_COUNTER is provided by higher layers [11]. |
| . . . |
| If partial sensing is configured by higher layers then the following steps are used: |
| 1) A candidate single-subframe resource for PSSCH transmission $R_{x,y}$ is defined as a set of $L_{subCH}$ contiguous sub-channels with sub-channel x+j in subframe $t_y^{SL}$ where j = 0, . . . , $L_{subCH}-1$. The UE shall determine by its implementation a set of subframes which consists of at least Y subframes within the time interval $[n + T_1, n + T_2]$ where selections of $T_1$ and $T_2$ are up to UE implementations under $T_1 \le 4$ and $T_{2min}(prio_{TX}) \le T_2 \le 100$, if $T_{2min}(prio_{TX})$ is provided by higher layers for $prio_{TX}$, otherwise $20 \le T_2 \le 100$ . UE selection of $T_2$ shall fulfil the latency requirement and Y shall be greater than or equal to the high layer parameter minNumCandidateSF. The UE shall assume that any set of $L_{subCH}$ contiguous sub-channels included in the corresponding PSSCH resource pool (described in 14.1.5) within the determined set of subframes correspond to one candidate single-subframe resource. The total number of the candidate single-subframe resources is denoted by $M_{total}$. |
| 2) If a subframe $t_y^{SL}$ is included in the set of subframes in Step 1, the UE shall monitor any subframe $t_{y-k\times P_{step}}^{SL}$ if k-th bit of the high layer parameter gapCandidateSensing is set to 1. The UE shall perform the behaviour in the following steps based on PSCCH decoded and S-RSSI measured in these subframes. |
| 3) The parameter $Th_{a,b}$ is set to the value indicated by the i-th SL-ThresPSSCH-RSRP field in SL-ThresPSSCH-RSRP-List where i = (a − 1) * 8 + b. |
| 4) The set $S_A$ is initialized to the union of all the candidate single-subframe resources. The set $S_B$ is initialized to an empty set. |

TABLE 10

| 5) The UE shall exclude any candidate single-subframe resource $R_{x,y}$ from the set $S_A$ if it meets all the following conditions: |
|---|
| the UE receives an SCI format 1 in subframe $t_m^{SL}$, "Resource reservation" field and "Priority" field in the received SCI format 1 indicate the values $P_{rsvp\_RX}$ and $prio_{Rx}$, respectively according to Subclause 14.2.1. |
| PSSCH-RSRP measurement according to the received SCI format 1 is higher than $TH_{prio_{TX},prio_{RX}}$. |
| the SCI format received in subframe $t_m^{SL}$ or the same SCI format 1 which is |

TABLE 10-continued assumed to be received in subframe(s) $t^{SL}_{m+q\times P_{step}\times P_{rsvp\_RX}}$ determines according to 14.1.1.4C the set of resource blocks and subframes which overlaps with $R_{x,y+j\times P'_{rsvp\_RX}}$ for q = 1, 2, … , Q and j = 0, 1, … , $C_{resel}-1$. Here, $Q = \frac{1}{P_{rsvp\_RX}}$ if $P_{rsvp\_RX} < 1$ and $y' - m \le P_{step} \times P_{rsvp\_RX} + P_{step}$, where $t^{SL}_{y'}$ is the last subframe of the Y subframes, and Q = 1 otherwise.

6) If the number of candidate single-subframe resources remaining in the set $S_A$ is smaller than $0.2 \cdot M_{total}$, then Step 4 is repeated with $Th_{a,b}$ increased by 3 dB.
7) For a candidate single-subframe resource $R_{x,y}$ remaining in the set $S_A$, the metric $E_{x,y}$ is defined as the linear average of S-RSSI measured in sub-channels x + k for k = 0, . . . , $L_{subCH} - 1$ in the monitored subframes in Step 2 that can be expressed by $t^{SL}_{y-P_{step}*j}$ for a non-negative integer j.
8) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$.
9) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].

TABLE 11

The UE shall report set Sp to higher layers.
If transmission based on random selection is configured by upper layers and when the UE is configured by upper layers to transmit using resource pools on multiple carriers, the following steps are used:

1) A candidate single-subframe resource for PSSCH transmission $R_{x,y}$ is defined as a set of $L_{subCH}$ contiguous sub-channels with sub-channel x+j in subframe $t^{SL}_{y}$ where j = 0, . . . , $L_{subCH} - 1$. The UE shall assume that any set of $L_{subCH}$ contiguous sub-channels included in the corresponding PSSCH resource pool (described in 14.1.5) within the time interval $[n + T_1, n + T_2]$ corresponds to one candidate single-subframe resource, where selections of $T_1$ and $T_2$ are up to UE implementations under $T_1 \le 4$ and $T_{2min}(prio_{TX}) \le T_2 \le 100$, if $T_{2min}(prio_{TX})$ is provided by higher layers for $prio_{TX}$, otherwise $20 \le T_2 \le 10$ (UE selection of $T_2$ shall fulfil the latency requirement. The total number of the candidate single-subframe resources is denoted by $M_{total}$.
2) The set $S_A$ is initialized to the union of all the candidate single-subframe resources. The set $S_B$ is initialized to an empty set.
3) The UE moves the candidate single-subframe resource $R_{x,y}$ from the set $S_A$ to $S_B$
4) The UE shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].

The UE shall report set $S_B$ to higher layers.

For example, in various embodiments of the present disclosure, periodic-based partial sensing (PPS) may refer to an operation of performing sensing at a time point corresponding to an integer multiple (k) of each period, based on periods of the number corresponding to a specific configuration value, when performing sensing for resource selection. For example, the periods may be periods of transmission resources configured in a resource pool. For example, a resource at a time point that is earlier by an integer multiple k of each period may be sensed from a time point of a candidate resource that is a target for determining resource collision. For example, the k value may be configured in a form of a bitmap.

Figure 8:
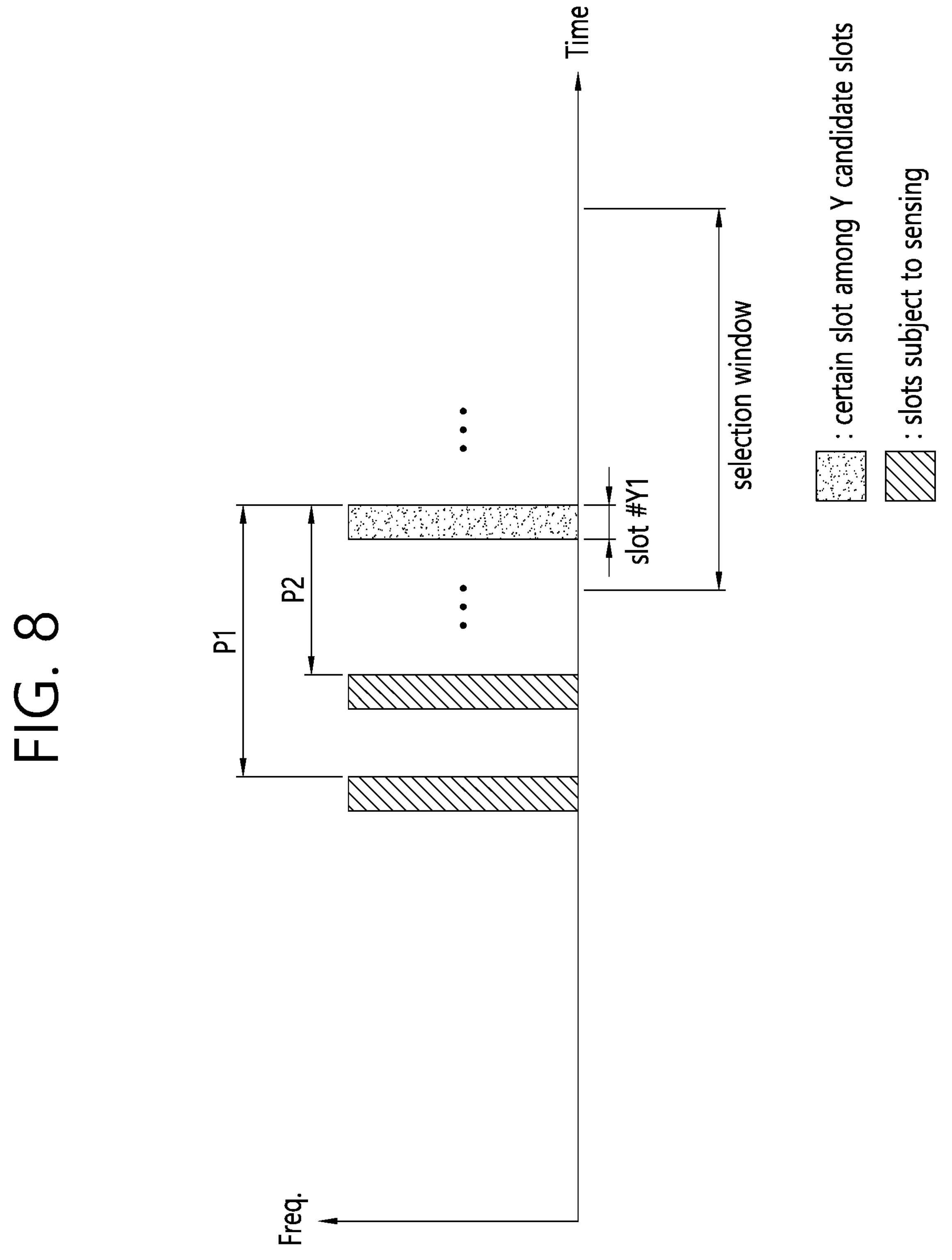
FIGS. 8 and 9 show a method for a UE to perform PPS according to an embodiment of the present disclosure.
Figure 9:
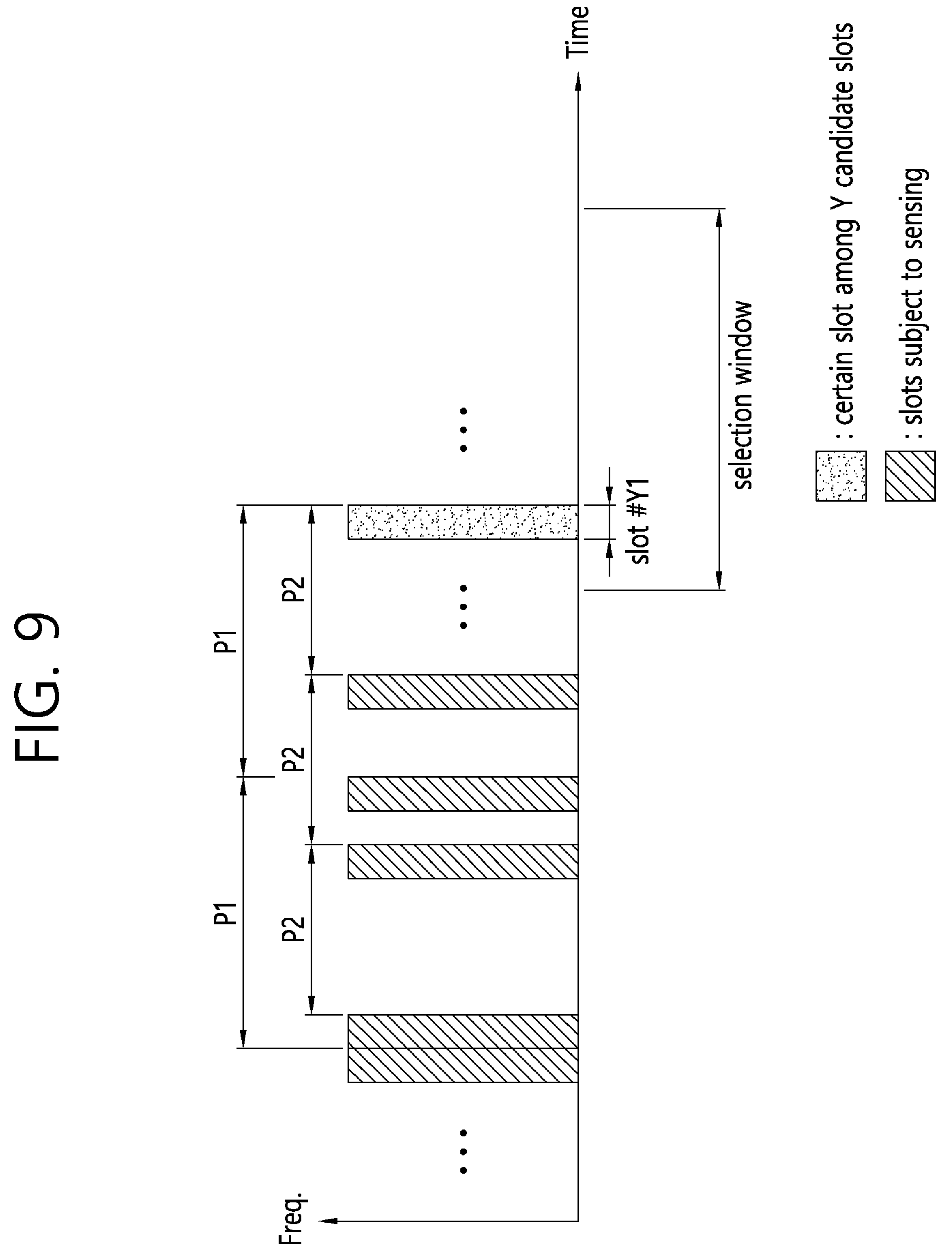

FIGS. 8 and 9 show a method for a UE to perform PPS according to an embodiment of the present disclosure. The embodiments of FIGS. 8 and 9 may be combined with various embodiments of the present disclosure.

Referring to FIGS. 8 and 9, it is assumed that a resource reservation period allowed for a resource pool or a resource reservation period configured for PPS is P1 and P2. Furthermore, it is assumed that a UE performs partial sensing (i.e., PPS) for selecting an SL resource in slot #Y1.

Referring to FIG. 8, a UE may perform sensing on a slot positioned before P1 from slot #Y1 and a slot positioned before P2 from slot #Y1.

Referring to FIG. 9, a UE may perform sensing on a slot located before P1 from slot #Y1 and a slot located before P2 from slot #Y1. Furthermore, optionally, a UE may perform sensing on a slot positioned before A*P1 from slot #Y1 and a slot positioned before B*P2 from slot #Y1. For example, A and B may be positive integers of 2 or greater. Specifically, for example, a UE selecting slot #Y1 as a candidate slot may perform sensing for slot #(Y1−resource reservation period *k), and k may be a bitmap. For example, if k is 10001, a UE selecting slot #Y1 as a candidate slot may perform sensing for slot #(Y1−P1*1), slot #(Y1−P1*5), slot #(Y1−P2*1), and slot #(Y1−P2*5).

For example, according to various embodiments of the present disclosure, continuous partial sensing (CPS) may refer to an operation of sensing all or a part of a time domain given as a specific configuration value. For example, CPS may include a short-term sensing operation in which sensing is performed for a relatively short period.

Figure 10:
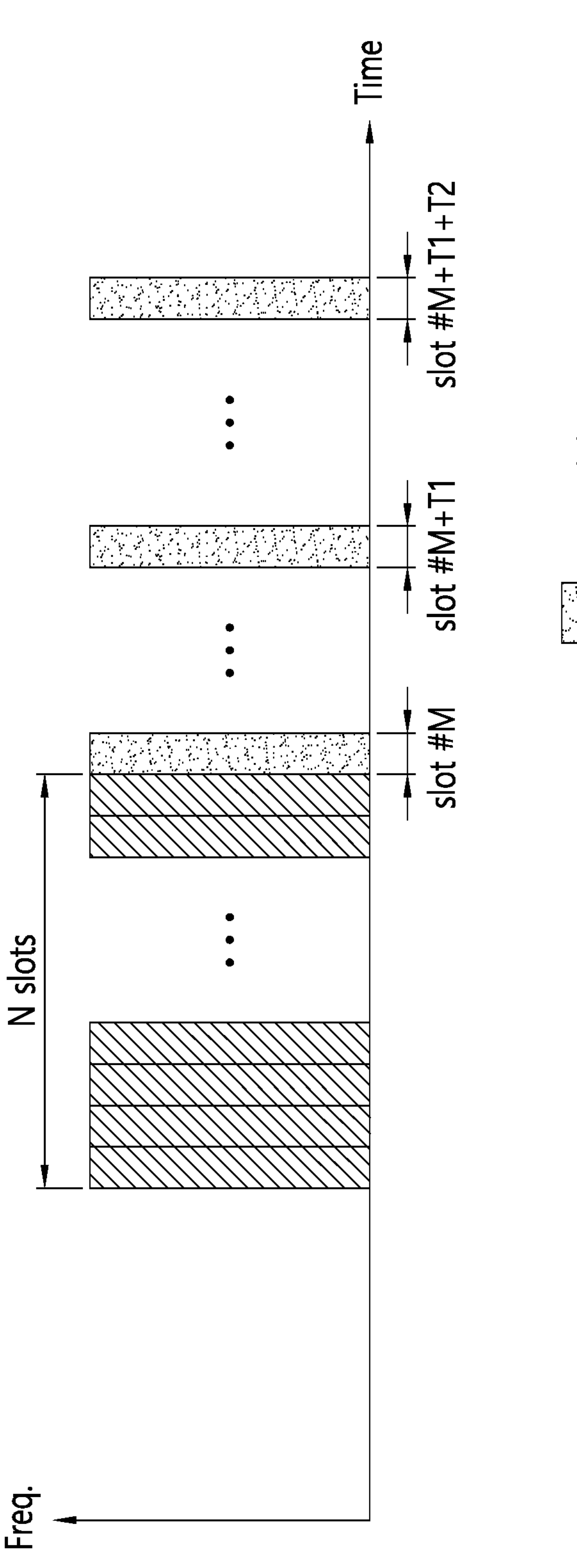
FIG. 10 shows a method for a UE to perform CPS, according to an embodiment of the present disclosure.

FIG. 10 shows a method for a UE to perform CPS, according to an embodiment of the present disclosure. The embodiment of FIG. 10 may be combined with various embodiments of the present disclosure.

In the embodiment of FIG. 10, it is assumed that Y candidate slots selected by a UE are slot #M, slot #(M+T1), and slot #(M+T1+T2). In this case, a slot in which a UE needs to perform sensing may be determined based on the first slot (i.e., slot #M) among Y candidate slots. For example, after determining the first slot among Y candidate slots as a reference slot, a UE may perform sensing for (previous) N slots from the reference slot.

Referring to FIG. 10, based on the first slot (i.e., slot #M) among Y candidate slots, a UE may perform sensing of N slots. For example, a UE may perform sensing for N slots before slot #M, the UE may select at least one SL resource from in Y candidate slots (i.e., slot #M, slot #(M+T1), and slot #(M+T1+T2)) based on a sensing result. For example, N may be configured or pre-configured for a UE. For example, a time gap for processing may exist between the last slot among the N slots and slot #M.

On the other hand, according to the prior art, when partial sensing is performed, there is a problem that the transmission period of a UE is not considered, resulting in continuous resource conflicts.

According to one embodiment of the present disclosure, a method of performing partial sensing considering a transmission period of a UE and a device supporting the same are proposed.

For example, for (or, for each of) at least one among elements/parameters of service type (and/or (LCH or service) priority and/or QOS requirements (e.g., latency, reliability, minimum communication range) and/or PQI parameters) (and/or HARQ feedback enabled (and/or disabled) LCH/MAC PDU (transmission) and/or CBR measurement value of a resource pool and/or SL cast type (e.g., unicast, groupcast, broadcast) and/or SL groupcast HARQ feedback option (e.g., NACK only feedback, ACK/NACK feedback, NACK only feedback based on TX-RX distance) and/or SL mode 1 CG type (e.g., SL CG type 1/2) and/or SL mode type (e.g., mode 1/2) and/or resource pool and/or PSFCH resource configured resource pool and/or source (L2) ID (and/or destination (L2) ID) and/or PC5 RRC connection/link and/or SL link and/or (with base station) connection state (e.g., RRC connected state, IDLE state, inactive state) and/or whether an SL HARQ process (ID) and/or (of a transmitting UE or a receiving UE) performs an SL DRX operation and/or whether it is a power saving (transmitting or receiving) UE and/or (from the perspective of a specific UE) case when PSFCH transmission and PSFCH reception (and/or a plurality of PSFCH transmissions (exceeding UE capability)) overlap (and/or a case where PSFCH transmission (and/or PSFCH reception) is omitted) and/or a case where a receiving UE actually (successfully) receives a PSCCH (and/or PSSCH) (re)transmission from a transmitting UE, etc.), whether the rule is applied (and/or the proposed method/rule-related parameter value of the present disclosure) may be specifically (or differently or independently) configured/allowed. In addition, in the present disclosure, “configuration” (or “designation”) wording may be extended and interpreted as a form in which a base station informs a UE through a predefined (physical layer or higher layer) channel/signal (e.g., SIB, RRC, MAC CE) (and/or a form provided through pre-configuration and/or a form in which a UE informs other UEs through a predefined (physical layer or higher layer) channel/signal (e.g., SL MAC CE, PC5 RRC)), etc. In addition, in this disclosure, the “PSFCH” wording may be extended and interpreted as “(NR or LTE) PSSCH (and/or (NR or LTE) PSCCH) (and/or (NR or LTE) SL SSB (and/or UL channel/signal))”. And, the methods proposed in the present disclosure may be used in combination with each other (in a new type of manner).

For example, the term “specific threshold” below may refer to a threshold value defined in advance or (pre-)configured by a higher layer (including an application layer) of a network, a base station, or a UE. Hereinafter, the term “specific configuration value” may refer to a value defined in advance or (pre-)configured by a higher layer (including an application layer) of a network, a base station, or a UE. Hereinafter, “configured by a network/base station” may mean an operation in which a base station configures (in advance) a UE by higher layer RRC signaling, configures/signals a UE through MAC CE, or signals a UE through DCI.

Hereinafter, PPS (or PBPS) means periodic-based partial sensing, and may mean an operation of performing sensing at a time point corresponding to an integer multiple (k) of each period based on periods of a specific configuration value number when sensing for resource selection is performed. For example, the periods may be a period of the transmission resource configured in a transmission pool, a resource of an integer multiple (k value) of each period before the candidate resource time, which is a target for determining resource collision in time, may be sensed, the k value may be configured in a form of a bitmap. Hereinafter, CPS may mean continuous partial sensing, and may mean an operation of sensing all or a part of a time domain given as a specific configuration value. For example, CPS may include a short-term sensing (STS) operation in which sensing is performed for a relatively short period.

According to one embodiment of the present disclosure, when partial sensing is configured in a resource pool and periodic transmission is allowed, the following operation may be possible when selection for a periodic transmission resource in slot n is triggered and contiguous partial sensing (CPS) and/or periodic-based partial sensing (PBPS) for a UE to select a periodic transmission resource is performed.

According to one embodiment of the present disclosure, a transmission resource period to be used by a UE for PBPS may be configured to a part of or all of transmission resource periods configured in a resource pool. In this case, when a part of the configured transmission resource periods in the resource pool is configured for PBPS, the configured transmission resource period may be configured to include the transmission period of a packet to be transmitted by the UE. Alternatively, for example, when a UE performs PBPS, it may perform PBPS based on a transmission resource period corresponding to the sum of the above configured transmission resource period and the transmission period of the packet to be transmitted by the UE.

According to one embodiment of the present disclosure, for a candidate resource selected by a UE for periodic transmission, for a time interval determined by a specific threshold, the UE may exclude the candidate resource from idle resources for a transmission if the UE has not completed performing the (pre)configured/required PBPS based on the transmission period of the packet to be transmitted. Alternatively, a UE may exclude a candidate resource from idle resources for a transmission if the UE has not performed/completed sensing for the configured/required monitoring occasion for the candidate resource even through, for example, CPS or partial sensing for other packet transmissions by the UE. For example, in the present disclosure, monitoring occasion and sensing slot may be mutually substituted/replaced.

According to one embodiment of the present disclosure, for any candidate resource selected by a UE for periodic transmission, for a time interval determined by a specific threshold value, if the UE fails to complete performing (pre-)configured/required PBPS based on a transmission period of a packet to be transmitted, continuous resource conflicts may be caused by transmissions from other UEs using the same transmission period. Therefore, in this case, the UE may not include a reservation period in SCI indicating the period for the next transmission resource, or may transmit the periodic transmission packet via a dynamic transmission (or aperiodic transmission) where the reservation period value is set to zero. Alternatively, for example, if sensing of configured/required monitoring occasions for all the candidate resources has not been performed/completed, even through CPS or partial sensing for transmission of other packets of the UE, the UE may not include a reservation period indicating the interval for the next transmission resource in the SCI, or may transmit the periodic transmission packet via dynamic transmission (or, aperiodic transmission) setting the reservation period value to zero.

Figure 11:
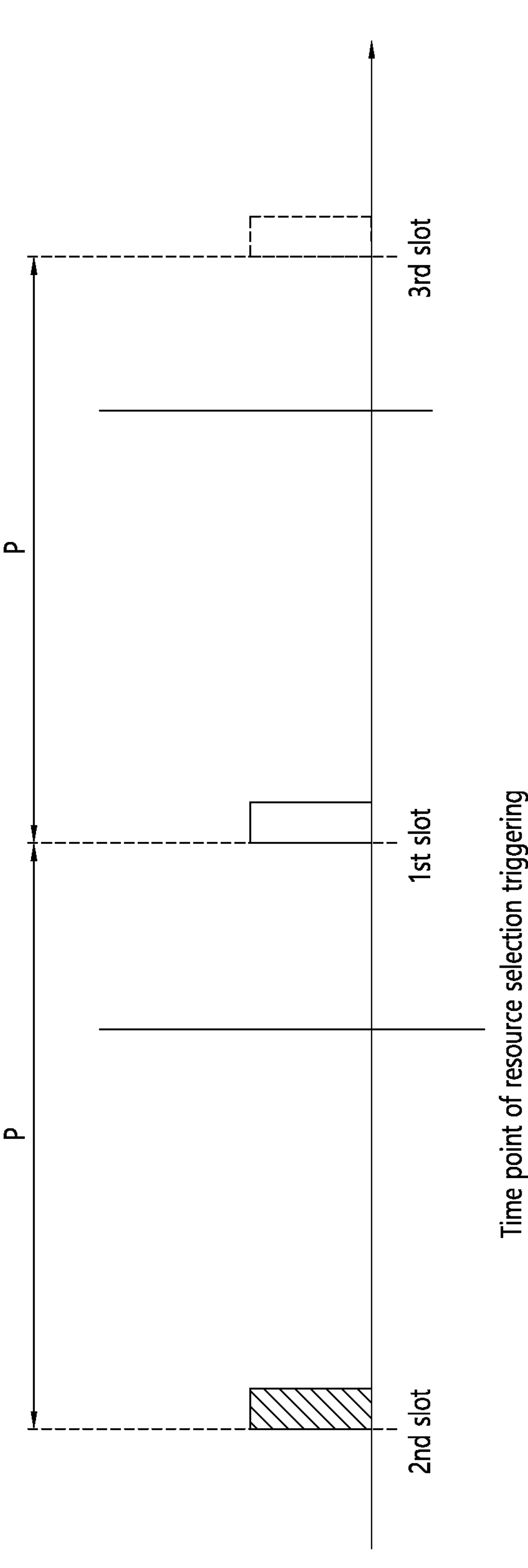
FIG. 11 shows an embodiment in which a transmitting UE does not include information related to a resource reservation period in SCI, according to one embodiment of the present disclosure.

FIG. 11 shows an embodiment in which a transmitting UE does not include information related to a resource reservation period in SCI, according to one embodiment of the present disclosure.

Referring to FIG. 11, the first slot may be one of candidate slots for partial sensing, selected by a transmitting UE performing periodic transmissions. The second slot may be a sensing slot, determined based on the first slot, based on one (P) of a resource reservation period configured in a resource pool or a transmission period of a MAC PDU to be transmitted by the transmitting UE. Here, for example, the transmitting UE may attempt partial sensing for the second slot. In this embodiment, it is assumed that the partial sensing is not completed.

Here, based on the partial sensing not being completed, the transmitting UE may transmit SCI based on the transmission resource in the first slot, but without including information related to a resource reservation period in the SCI. Alternatively, the value of the resource reservation period field of the SCI may be zero, i.e., the SCI may not include information related to resource reservation period, even though the transmitting UE is a UE performing periodic transmissions. The third slot may be a slot related to the same resource in the next period of the resource included in the first slot. Since the SCI does not include information related to a resource reservation period, other UEs monitoring the transmitted SCI may not exclude a resource related to the third slot from the resource selection procedure.

Since the transmitting UE has not completed partial sensing in the second slot, it is likely that a candidate resource related to the second slot will be excluded during the resource selection procedure. If the transmitting UE includes information related to a resource reservation period in SCI even when partial sensing is not complete, it is likely that the excluded candidate resource (e.g., resource in the third slot) is also not used by other UEs. In other words, according to this embodiment, it is possible to increase the probability of using an unused and wasted resource and avoid wasting resources.

Figure 12:
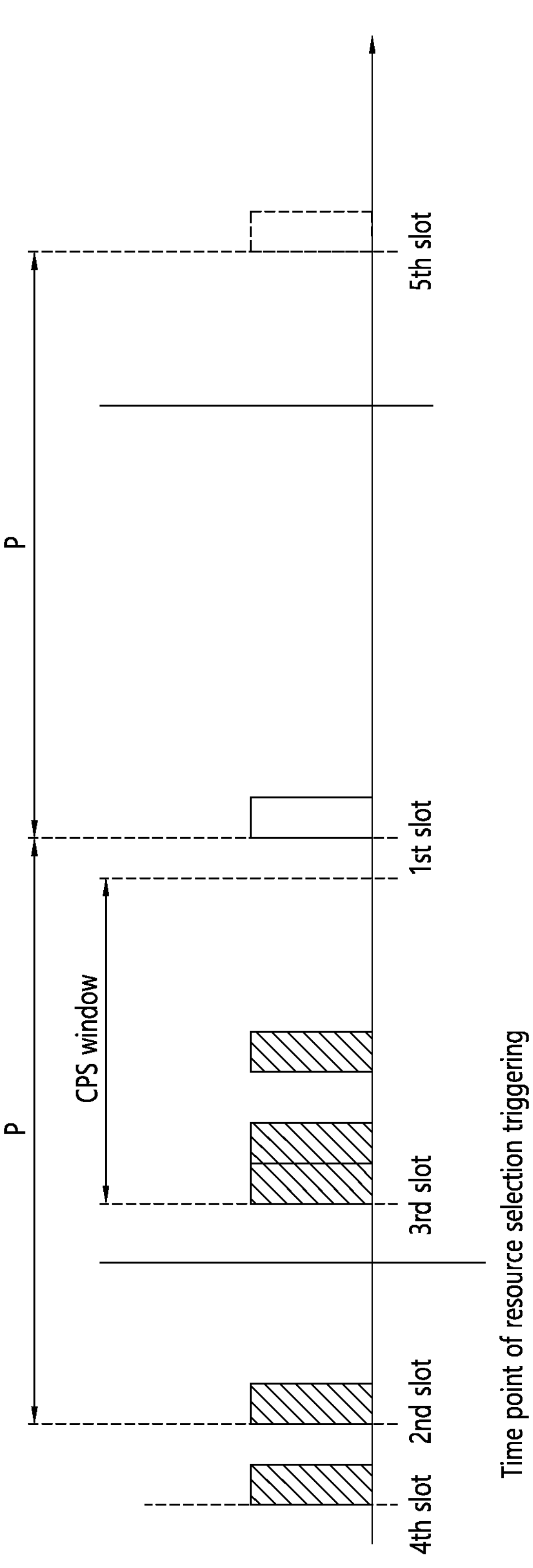
FIG. 12 shows an embodiment in which a transmitting UE does not include information related to the resource reservation period in SCI, according to one embodiment of the present disclosure.

FIG. 12 shows an embodiment in which a transmitting UE does not include information related to the resource reservation period in SCI, according to one embodiment of the present disclosure.

Referring to FIG. 12, the colored squares (second slot, third slot, and fourth slot) may represent sensing slots related to the first slot. Here, the first slot may be one of candidate slots for partial sensing, selected by a transmitting UE performing periodic transmissions. The second slot may be a sensing slot, determined based on the first slot, based on one (P) of a resource reservation period configured in a resource pool, or a transmission period of a MAC PDU to be transmitted by the transmitting UE. The third slot(s) may be a sensing slot(s) included in a CPS window, which may be determined if the first slot is a candidate slot related to CPS. The fourth slot may be a sensing slot for transmission of another packet by the transmitting UE. In this embodiment, it is assumed that partial sensing of the second slot, the third slot(s), and the fourth slot is not all completed.

Wherein, based on partial sensing not being completed for the second slot, the third slot(s), and the fourth slot, the transmitting UE may transmit SCI based on a transmission resource in the first slot, but without including information related to a resource reservation period in the SCI. Alternatively, the value of the resource reservation period field of the SCI may be zero, i.e., the SCI may not include information related to a resource reservation period, even though the transmitting UE is a UE performing periodic transmissions. The fifth slot may be a slot related to the same resource in the next period of the resource included in the first slot. Since the SCI does not include information related to a resource reservation period, other UEs monitoring the transmitted SCI may not exclude a resource related to the fifth slot in their resource selection procedure.

Since partial sensing has not been completed in the second slot, the third slot(s), and the fourth slot, the transmitting UE is likely to exclude a candidate resource related to the second slot, the third slot(s), and the fourth slot during the resource selection procedure. If the transmitting UE includes information related to a resource reservation period in SCI even when partial sensing is not complete, it is likely that a candidate resource that is likely to be excluded (e.g., a resource in the fifth slot) is also not used by other UEs. In other words, according to the present embodiment, it is possible to increase the probability of using resources that would otherwise be unused and wasted, and to prevent resource waste.

According to one embodiment of the present disclosure, if a UE fails to complete performing PBPS based on a transmission period of a packet to be transmitted, for a time interval determined by the specific threshold, the UE may select a resource based on CPS and perform the dynamic transmission (or, aperiodic transmission), or may randomly select a resource within a resource selection window to transmit the packet, or may use a resource included in an exceptional pool configured in the resource pool to transmit the packet.

According to one embodiment of the present disclosure, the time interval set by the specific threshold may be 1 second, or 1100 ms, or the longest resource transmission period configured in the resource pool, or an integer multiple of a specific set value of the transmission period of a packet to be transmitted by a UE, or set to a specific threshold.

According to one embodiment of the present disclosure, a UE may perform a periodic transmission in which the UE includes a transmission period of the packet in SCI as a reservation period, for a time interval determined by the specific threshold, only after the UE has completed performing PBPS based on the transmission period of the packet to be transmitted.

According to one embodiment of the present disclosure, when a UE attempts to perform a periodic transmission, among resource transmission periods configured in the resource pool (or a resource transmission period for PBPS configured for the UE with a specific set value), it may perform a periodic transmission that includes a reservation period in SCI that indicates a period for the next transmission resource only based on a transmission period in which configured/required PBPS performing has been completed, for a time interval determined by the specific threshold.

According to one embodiment of the present disclosure, if a UE fails to complete (pre-)configured/required PBPS performing based on a resource transmission period determined by a specific set value, within a time interval determined by a specific threshold value, for a candidate resource selected by the UE for periodic transmission, the UE may exclude the candidate resource from idle resources for a transmission. Alternatively, for example, if sensing of configured/required monitoring occasions for the candidate resource has not been performed/completed, even through CPS or partial sensing for a transmission of another packet by the UE, the UE may exclude the candidate resource from idle resources for a transmission.

According to various embodiments of the present disclosure, since the transmission period of a UE is considered when performing partial sensing, the effect may occur that ongoing resource conflicts are minimized.

On the other hand, partial sensing in prior art has not been optimized for SL DRX (discontinuous reception) operation, resulting in sub-optimal UE power saving.

According to one embodiment of the present disclosure, a partial sensing method and a device supporting the same are proposed that may minimize power consumption of a UE even under SL DRX operating conditions.

According to one embodiment of the present disclosure, in a resource pool with SL DRX operation configured, if a resource (re)selection operation is triggered at a time point of slot n for a UE that selects resources based on full sensing or CPS, the UE may configure a resource selection window [n+T1, n+T2] by the UE implementation.

For example, within the resource selection window duration, a UE may select an idle resource for SL transmission to be reported from the UE's physical layer to MAC layer, based on full sensing or CPS results, only within an SL DRX on-duration or SL DRX active time period used by a receiving UE, that is configured in the resource pool and common to UEs.

Alternatively, for example, within the resource selection window; from among idle resources for SL transmission reported from the physical layer, the UE may select, at the MAC layer, a final SL transmission resource based on full sensing or CPS results only from among idle resources within an on-duration of an SL DRX configuration used by a receiving UE, that is common to UEs configured in the resource pool or within an active time duration of the SL DRX configuration.

According to one embodiment of the present disclosure, in the above cases, a UE may select idle resources to satisfy a target number of idle resources set to a specific threshold value, or a ratio X of the number of idle resources to the total number of SL transmission resources. In this case, for example, a UE may determine the number of total SL transmission resources to be the number of total SL transmission resources within the resource selection window, or the number of total SL transmission resources within the on-duration or the active time duration. According to one embodiment of the present disclosure, in a resource pool with SL DRX operation configured, if a periodic resource (re)selection operation is triggered at time point of slot n for a UE that selects resources based on PBPS, the UE may configure the resource selection window [n+T1, n+T2] duration by the UE implementation.

For example, within the resource selection window interval, a UE may configure candidate slots for PBPS only within an SL DRX on-duration or an SL DRX active time duration used by a receiving UE, that is common to UEs configured in the resource pool, and select an idle resource for an SL transmission to be reported from the UE's physical layer to the MAC layer based on the PBPS results.

Alternatively, for example, within the resource selection window, from among idle resources for an SL transmission reported from the physical layer, a UE may select, at the MAC laver, the final SL transmission resource only from among idle resources within an SL DRX on-duration or SL DRX active time duration used by a receiving UE, that is common to UEs configured in the resource pool.

According to one embodiment of the present disclosure, in the above cases, a UE may select idle resources to satisfy a target number of idle resources set to a specific threshold value, or a ratio X of the number of idle resources to the total number of SL transmission resources. In this case, for example, the UE may determine the total number of SL transmission resources to be the total number of SL transmission resources within the resource selection window; or the total number of SL transmission resources within the on-duration of an SL DRX configuration or an active time duration of the SL DRX configuration.

According to one embodiment of the present disclosure, in a resource pool with an SL DRX operation configured, when a periodic resource (re)selection operation is triggered at slot n for a transmitting UE selecting a resource based on PBPS, an SL DRX configuration has not been exchanged via a PC5-RRC connection or the like between the transmitting UE and a receiving UE, and when it is first exchanged, the number of slots monitored for PBPS for the first transmission resource of the transmitting UE within an SL DRX on-duration of the receiving UE may be below a specific threshold value. For example, as described above, after the SL DRX configuration information is exchanged between the transmitting UE and the receiving UE, if (from the receiving UE's perspective) there are insufficient PBPS results for a transmission resource of the transmitting UE within the on-duration or active time interval of the SL DRX configuration, the transmitting UE may shift the resource selection window for resource (re)selection backward in the time domain, perform a CPS, and select a transmission resource within the shifted resource selection window based on the CPS results.

According to one embodiment of the present disclosure, a transmitting UE may, without shifting the resource selection window for resource (re)selection, first perform a CPS within the resource selection window and then select an SL transmission resource based on the CPS result.

According to one embodiment of the present disclosure, as described above, in an SL DRX operation, if the PBPS result for a transmission resource of the transmitting UE within an on-duration or an active time duration of the SL DRX configuration is insufficient (from the perspective of the receiving UE), the transmitting UE may use a resource belonging to an exceptional resource pool to transmit the corresponding TB that it was trying to transmit.

According to various embodiments of the present disclosure, the effect of performing partial sensing to minimize UE power consumption may occur even under SL DRX operating conditions.

For example, if a transmitting UE performs resource selection based on a PBPS, if the PBPS has not been successfully completed by the UE, the transmitting UE may not have sufficient information regarding a transmission resource related to the resource reservation period related to the PBPS. Therefore, the transmitting UE is likely to not use the resource for which the PBPS has not been successfully completed. In this case, if the transmitting UE includes information related to a resource reservation period in SCI and transmits it, UEs using the resource reservation period among UEs monitoring the SCI are likely not to select the unused transmission resources, and in this case, a waste of resources may occur because resources that could be used are not used.

According to an embodiment of the present disclosure, if the PBPS is not successfully completed, a transmitting UE may not include information related to a resource reservation period in SCI, and a UE receiving the SCI may use resources related to the PBPS to perform communication. Thus, the above-described problem of wasting resources may be solved.

Figures 13, 14:
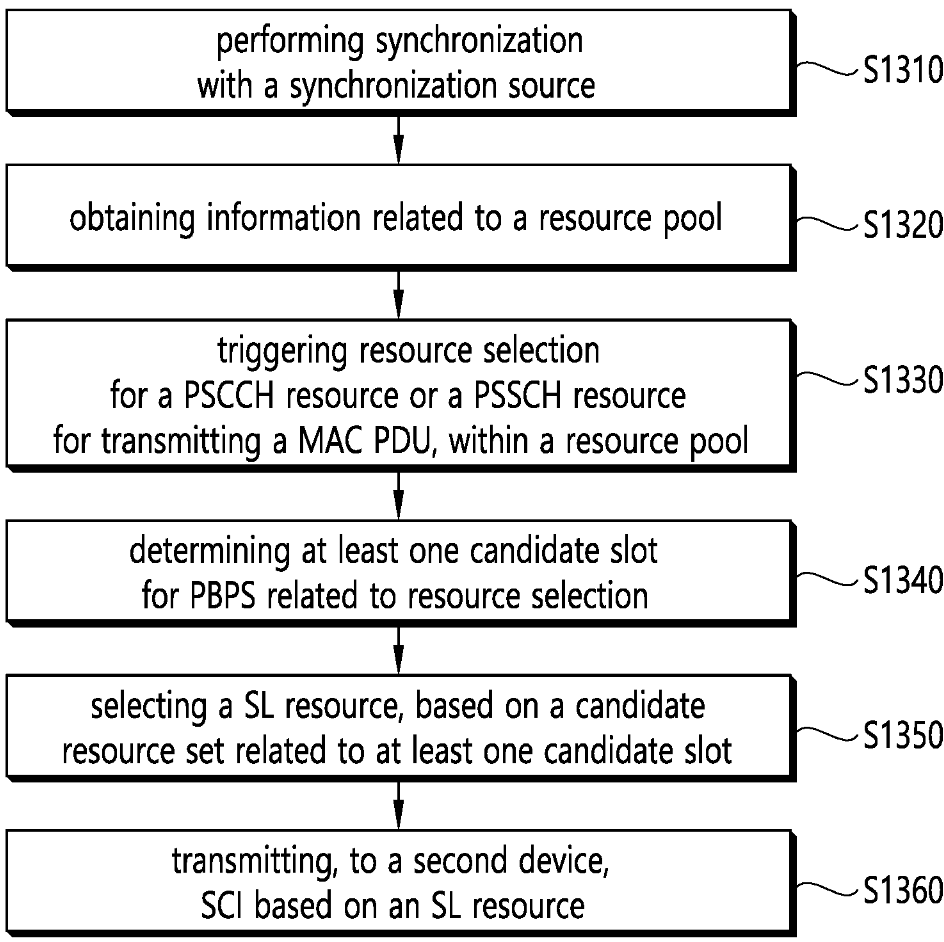
FIG. 13 shows a procedure in which a first apparatus performs wireless communication, according to an embodiment of the present disclosure.
FIG. 14 shows a procedure in which a second apparatus performs wireless communication, according to an embodiment of the present disclosure.

FIG. 13 shows a procedure for a first device to perform wireless communication, according to one embodiment of the present disclosure. The embodiment of FIG. 13 may be combined with various embodiments of the present disclosure.

Referring to FIG. 13, in step S1310, a first device may perform synchronization with a synchronization source. In step S1320, the first device may obtain information related to a resource pool. In step S1330, the first device may trigger resource selection for a physical sidelink control channel (PSCCH) resource or a physical sidelink shared channel (PSSCH) resource for transmitting a medium access control (MAC) protocol data unit (PDU), within the resource pool. In step S1340, the first device may determine at least one candidate slot for periodic based partial sensing (PBPS) related to the resource selection. In step S1350, the first device may select a sidelink (SL) resource, based on a candidate resource set related to the at least one candidate slot. In step S1360, the first device may transmit, to a second device, sidelink control information (SCI) based on the SL resource. For example, the SCI may not include information related to a reservation period of the MAC PDU, based on the PBPS related to a transmission period of the MAC PDU being not completed.

For example, additionally, the first device may attempt the PBPS on at least one first sensing slot related to the at least one candidate slot: and determine that the PBPS is not completed on a second sensing slot among the at least one first sensing slot. For example, the SL resource may be a resource related to the second sensing slot, and the SCI may not include the information related to the reservation period of the MAC PDU, based on the determination that the PBPS is not completed.

For example, a third sensing slot among the at least one first sensing slot may be determined based on a transmission period related to the MAC PDU.

For example, the at least one first sensing slot may be at least one slot that precedes the at least one candidate slot by k times the transmission period.

For example, the SL resource may be selected based on contiguous partial sensing (CPS), based on the PBPS being not completed.

For example, additionally, the first device may determine a resource selection window for the resource selection within the resource pool. For example, the SL resource may be randomly selected within the selection window, based on the PBPS being not completed.

For example, the PBPS may be attempted within a time duration which is determined based on a threshold value.

For example, the first device including information related to the reservation period of the MAC PDU in the SCI may be not allowed, based on the PBPS being not completed.

For example, a resource reservation period field value of the SCI may be 0), based on the PBPS being not completed.

For example, additionally, the first device may perform sensing for at least one sensing slot related to the at least one candidate slot: and exclude a resource with an RSRP greater than or equal to a threshold value from the candidate resource set, based on the performed sensing.

For example, the SL resource may be selected within the candidate resource set from which the resource with the RSRP greater than or equal to the threshold value is excluded.

For example, the resource selection may be related to a periodic transmission.

For example, additionally, the first device may determine a resource selection window for the resource selection within the resource pool. For example, the candidate resource set may be included within the resource selection window.

The embodiments described above may be applied to various devices described below. For example, a processor 102 of a first device 100 may perform synchronization with a synchronization source. And, the processor 102 of the first device 100 may obtain information related to a resource pool. And, the processor 102 of the first device 100 may trigger resource selection for a physical sidelink control channel (PSCCH) resource or a physical sidelink shared channel (PSSCH) resource for transmitting a medium access control (MAC) protocol data unit (PDU), within the resource pool. And, the processor 102 of the first device 100 may determine at least one candidate slot for periodic based partial sensing (PBPS) related to the resource selection. And, the processor 102 of the first device 100 may select a sidelink (SL) resource, based on a candidate resource set related to the at least one candidate slot. And, the processor 102 of the first device 100 may control a transceiver 106 to transmit, to a second device 200, sidelink control information (SCI) based on the SL resource. For example, the SCI may not include information related to a reservation period of the MAC PDU, based on the PBPS related to a transmission period of the MAC PDU being not completed.

According to an embodiment of the present disclosure, a first device for performing wireless communication may be proposed. For example, the first device may comprise: one or more memories storing instructions: one or more transceivers: and one or more processors connected to the one or more memories and the one or more transceivers. For example, the one or more processors may execute the instructions to: perform synchronization with a synchronization source: obtain information related to a resource pool: trigger resource selection for a physical sidelink control channel (PSCCH) resource or a physical sidelink shared channel (PSSCH) resource for transmitting a medium access control (MAC) protocol data unit (PDU), within the resource pool: determine at least one candidate slot for periodic based partial sensing (PBPS) related to the resource selection: select a sidelink (SL) resource, based on a candidate resource set related to the at least one candidate slot: and transmit, to a second device, sidelink control information (SCI) based on the SL resource, wherein the SCI may not include information related to a reservation period of the MAC PDU, based on the PBPS related to a transmission period of the MAC PDU being not completed.

For example, additionally, the first device may attempt the PBPS on at least one first sensing slot related to the at least one candidate slot: and determine that the PBPS is not completed on a second sensing slot among the at least one first sensing slot. For example, the SL resource may be a resource related to the second sensing slot, and the SCI may not include the information related to the reservation period of the MAC PDU, based on the determination that the PBPS is not completed.

For example, a third sensing slot among the at least one first sensing slot may be determined based on a transmission period related to the MAC PDU.

For example, the at least one first sensing slot may be at least one slot that precedes the at least one candidate slot by k times the transmission period.

For example, the SL resource may be selected based on contiguous partial sensing (CPS), based on the PBPS being not completed.

For example, additionally, the first device may determine a resource selection window for the resource selection within the resource pool. For example, the SL resource may be randomly selected within the selection window, based on the PBPS being not completed.

For example, the PBPS may be attempted within a time duration which is determined based on a threshold value.

For example, the first device including information related to the reservation period of the MAC PDU in the SCI may be not allowed, based on the PBPS being not completed.

For example, a resource reservation period field value of the SCI may be 0, based on the PBPS being not completed.

For example, additionally, the first device may perform sensing for at least one sensing slot related to the at least one candidate slot: and exclude a resource with an RSRP greater than or equal to a threshold value from the candidate resource set, based on the performed sensing.

For example, the SL resource may be selected within the candidate resource set from which the resource with the RSRP greater than or equal to the threshold value is excluded. For example, the resource selection may be related to a periodic transmission.

For example, additionally, the first device may determine a resource selection window for the resource selection within the resource pool. For example, the candidate resource set may be included within the resource selection window.

According to an embodiment of the present disclosure, a device adapted to control a first user equipment (UE) may be proposed. For example, the device may comprise: one or more processors: and one or more memories operably connectable to the one or more processors and storing instructions. For example, the one or more processors may execute the instructions to: perform synchronization with a synchronization source; obtain information related to a resource pool: trigger resource selection for a physical sidelink control channel (PSCCH) resource or a physical sidelink shared channel (PSSCH) resource for transmitting a medium access control (MAC) protocol data unit (PDU), within the resource pool: determine at least one candidate slot for periodic based partial sensing (PBPS) related to the resource selection: select a sidelink (SL) resource, based on a candidate resource set related to the at least one candidate slot: and transmit, to a second UE, sidelink control information (SCI) based on the SL resource, wherein the SCI may not include information related to a reservation period of the MAC PDU, based on the PBPS related to a transmission period of the MAC PDU being not completed.

According to an embodiment of the present disclosure, a non-transitory computer-readable storage medium storing instructions may be proposed. For example, the instructions, when executed, may cause a first device to: perform synchronization with a synchronization source: obtain information related to a resource pool: trigger resource selection for a physical sidelink control channel (PSCCH) resource or a physical sidelink shared channel (PSSCH) resource for transmitting a medium access control (MAC) protocol data unit (PDU), within the resource pool: determine at least one candidate slot for periodic based partial sensing (PBPS) related to the resource selection: select a sidelink (SL) resource, based on a candidate resource set related to the at least one candidate slot; and transmit, to a second device, sidelink control information (SCI) based on the SL resource, wherein the SCI may not include information related to a reservation period of the MAC PDU, based on the PBPS related to a transmission period of the MAC PDU being not completed.

FIG. 14 shows a procedure for a second device to perform wireless communication, according to one embodiment of the present disclosure. The embodiment of FIG. 14 may be combined with various embodiments of the present disclosure.

Referring to FIG. 13, in step S1410, a second device may receive, from a first device, sidelink control information (SCI) for transmitting a medium access control (MAC) protocol data unit (PDU) based on a sidelink (SL) resource. For example, the SL resource may be selected based on a candidate resource set related to at least one candidate slot, the at least one candidate slot may be at least one slot related to periodic based partial sensing (PBPS), and the SCI may not include information related to a reservation period of the MAC PDU, based on the PBPS related to a transmission period of the MAC PDU being not completed.

For example, the PBPS may be attempted on at least one sensing slot related to the at least one candidate slot, and the at least one sensing slot may be determined based on a resource reservation period related to a resource pool.

The embodiments described above may be applied to various devices described below. For example, a processor 202 of a second device 200 may control a transceiver 206 to receive, from a first device 100, sidelink control information (SCI) for transmitting a medium access control (MAC) protocol data unit (PDU) based on a sidelink (SL) resource. For example, the SL resource may be selected based on a candidate resource set related to at least one candidate slot, the at least one candidate slot may be at least one slot related to periodic based partial sensing (PBPS), and the SCI may not include information related to a reservation period of the MAC PDU, based on the PBPS related to a transmission period of the MAC PDU being not completed.

According to an embodiment of the present disclosure, a second device for performing wireless communication may be proposed. For example, the second device may comprise: one or more memories storing instructions: one or more transceivers: and one or more processors connected to the one or more memories and the one or more transceivers. For example, the one or more processors may execute the instructions to: receive, from a first device, sidelink control information (SCI) for transmitting a medium access control (MAC) protocol data unit (PDU) based on a sidelink (SL) resource, wherein the SL resource may be selected based on a candidate resource set related to at least one candidate slot, wherein the at least one candidate slot may be at least one slot related to periodic based partial sensing (PBPS), and wherein the SCI may not include information related to a reservation period of the MAC PDU, based on the PBPS related to a transmission period of the MAC PDU being not completed.

For example, the PBPS may be attempted on at least one sensing slot related to the at least one candidate slot, and the at least one sensing slot may be determined based on a resource reservation period related to a resource pool.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
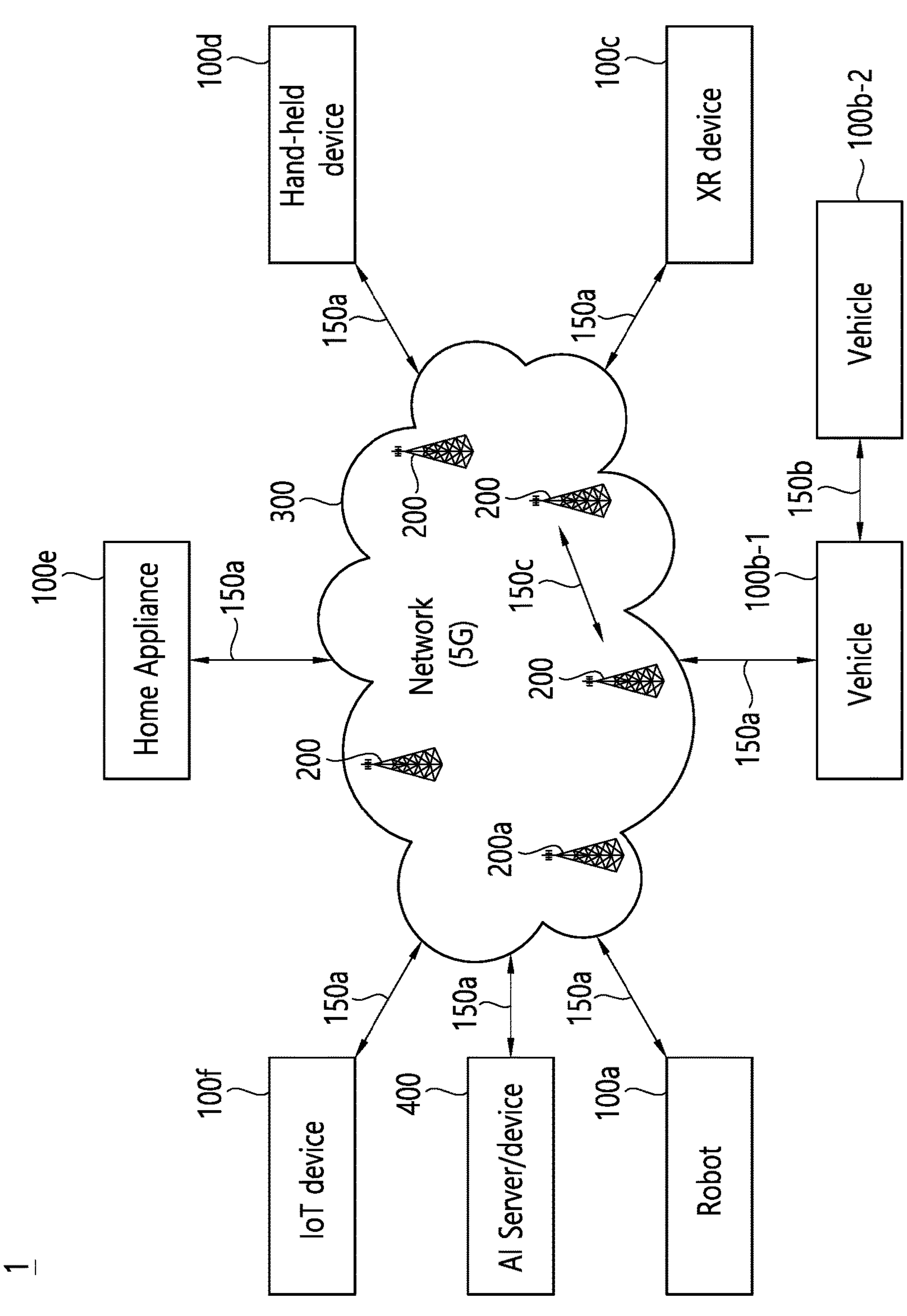
FIG. 15 shows a communication system 1, based on an embodiment of the present disclosure.

FIG. 15 shows a communication system 1, based on an embodiment of the present disclosure. The embodiment of FIG. 15 may be combined with various embodiments of the present disclosure.

Referring to FIG. 15, a communication system 1 to which various embodiments of the present disclosure are applied includes wireless devices. Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IOT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Here, wireless communication technology implemented in wireless devices 100*a* to 100*f* of the present disclosure may include Narrowband Internet of Things for low-power communication in addition to LTE, NR, and 6G. In this case, for example, NB-IOT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100*a* to 100*f* of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M. and is not limited to the name described above. Additionally or alternatively, the wireless communication technology implemented in the wireless devices 100*a* to 100*f* of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
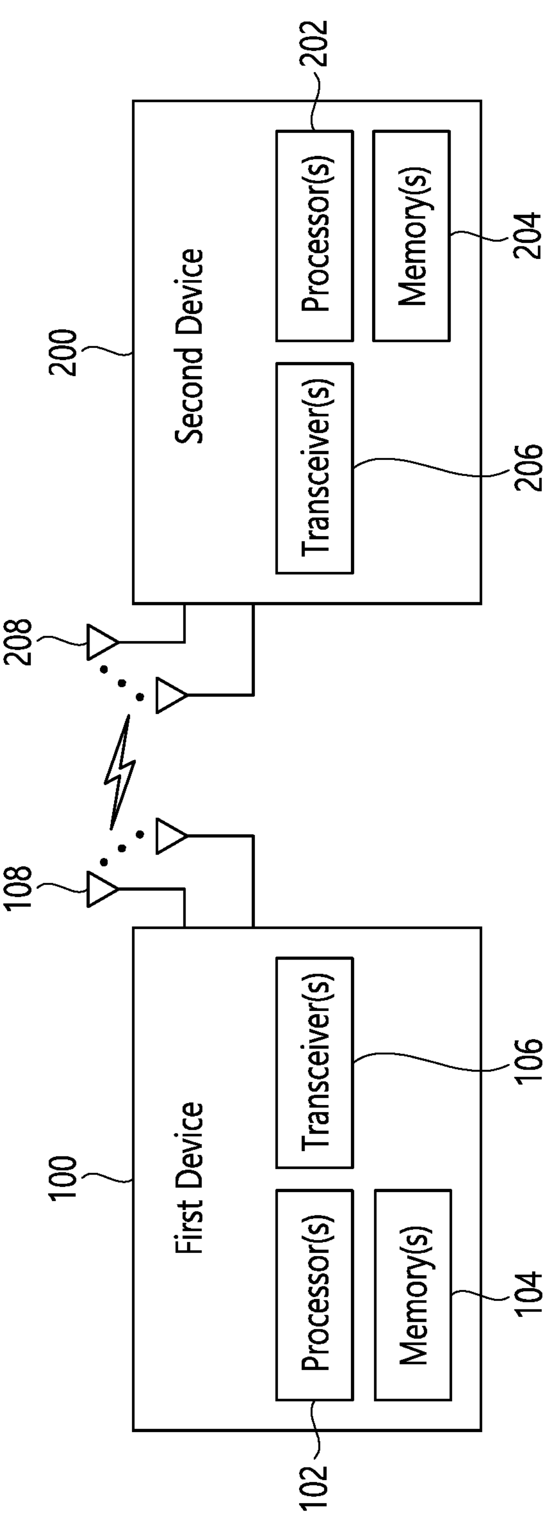
FIG. 16 shows wireless devices, based on an embodiment of the present disclosure.

FIG. 16 shows wireless devices, based on an embodiment of the present disclosure. The embodiment of FIG. 16 may be combined with various embodiments of the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP. RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
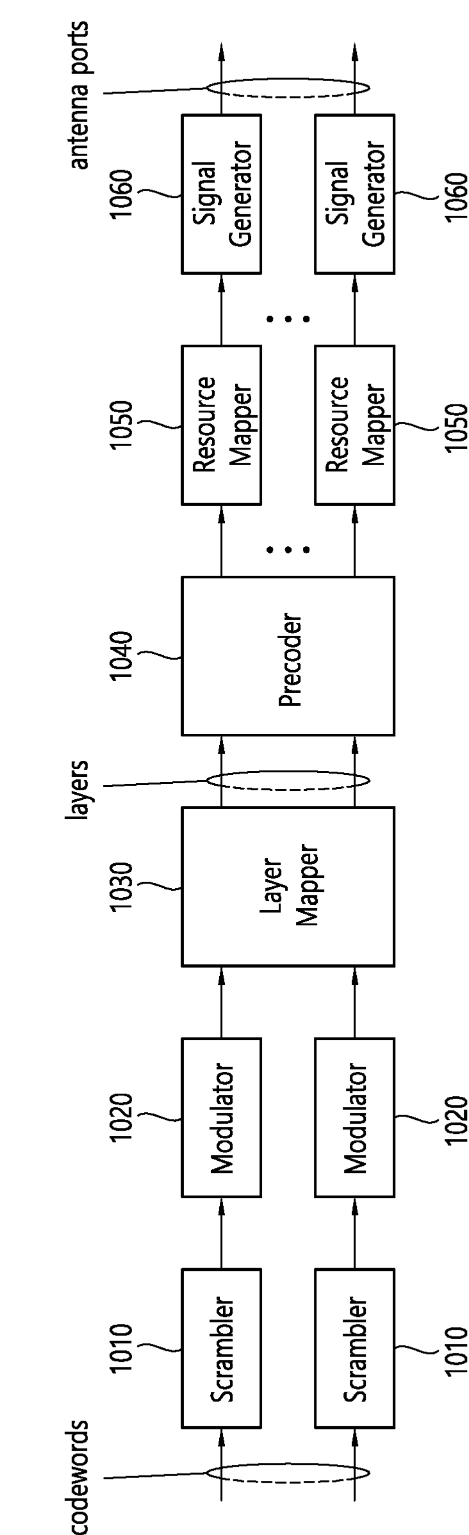
FIG. 17 shows a signal process circuit for a transmission signal, based on an embodiment of the present disclosure.

FIG. 17 shows a signal process circuit for a transmission signal, based on an embodiment of the present disclosure. The embodiment of FIG. 17 may be combined with various embodiments of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 18:
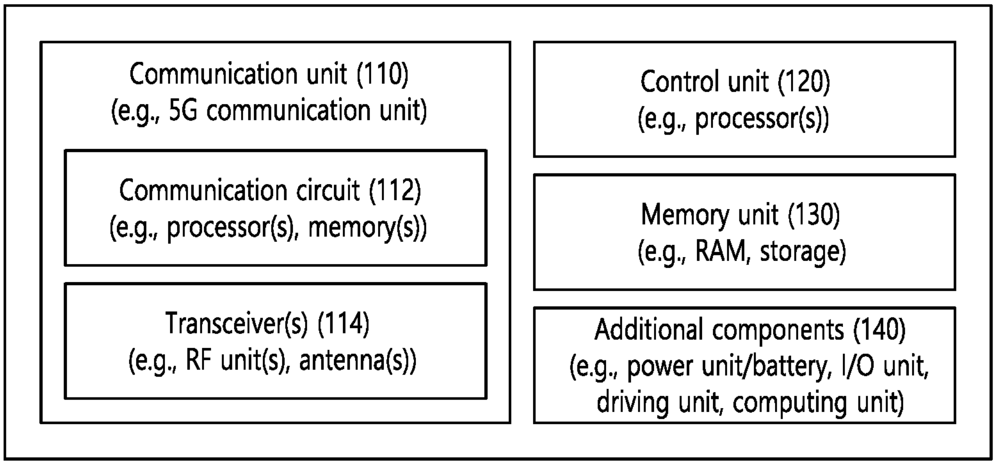
FIG. 18 shows another example of a wireless device, based on an embodiment of the present disclosure.

FIG. 18 shows another example of a wireless device, based on an embodiment of the present disclosure. The wireless device may be implemented in various forms according to a use-case/service (refer to FIG. 15). The embodiment of FIG. 18 may be combined with various embodiments of the present disclosure.

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 15), the vehicles (100*b*-1 and 100*b*-2 of FIG. 15), the XR device (100*c* of FIG. 15), the hand-held device (100*d* of FIG. 15), the home appliance (100*e* of FIG. 15), the IoT device (100*f* of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

Figure 19:
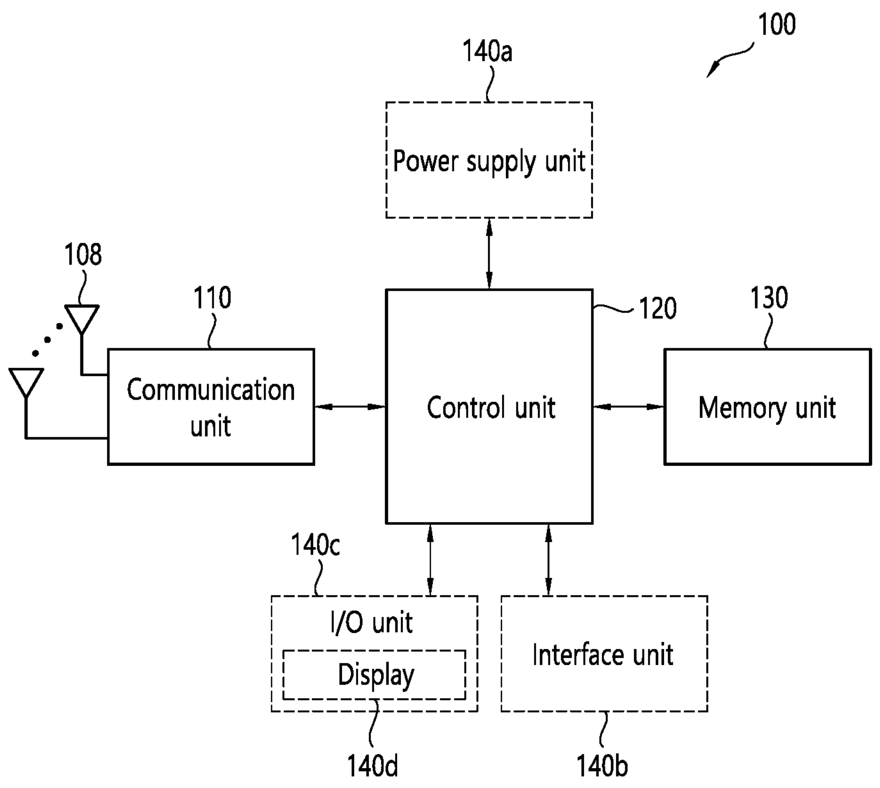
FIG. 19 shows a hand-held device, based on an embodiment of the present disclosure.

FIG. 19 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 19 may be combined with various embodiments of the present disclosure.

Referring to FIG. 19, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

FIG. 20 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 20 may be combined with various embodiments of the present disclosure.

Referring to FIG. 20, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:

performing synchronization with a synchronization source;

obtaining information related to a resource pool;

triggering resource selection for an inter-device physical control channel resource or an inter-device physical shared channel resource for transmitting a medium access control protocol data unit, within the resource pool;

determining at least one candidate slot for periodic based partial sensing related to the resource selection;

selecting an inter-device resource, based on a candidate resource set related to the at least one candidate slot; and transmitting, to a second device, inter-device control information based on the inter-device resource, wherein the inter-device control information does not include information related to a reservation period of the medium access control protocol data unit, when the periodic based partial sensing related to a transmission period of the medium access control protocol data unit is not completed.

2. The method of claim 1, further comprising:

attempting the periodic based partial sensing on at least one first sensing slot related to the at least one candidate slot; and determining that the periodic based partial sensing is not completed on a second sensing slot among the at least one first sensing slot, wherein the inter-device resource is a resource related to the second sensing slot, and wherein the inter-device control information does not include the information related to the reservation period of the medium access control protocol data unit, when it is determined that the periodic based partial sensing is not completed.

3. The method of claim 2, wherein a third sensing slot among the at least one first sensing slot is determined based on a transmission period related to the medium access control protocol data unit.

4. The method of claim 3, wherein the at least one first sensing slot is at least one slot that precedes the at least one candidate slot by k times the transmission period.

5. The method of claim 1, wherein the inter-device resource is selected based on contiguous partial sensing, when the periodic based partial sensing is not completed.

6. The method of claim 1, further comprising:

determining a resource selection window for the resource selection within the resource pool, wherein the inter-device resource is randomly selected within the selection window, when the periodic based partial sensing is not completed.

7. The method of claim 1, wherein the periodic based partial sensing is attempted within a time duration which is determined based on a threshold value.

8. The method of claim 1, wherein a first device including information related to the reservation period of the medium access control protocol data unit in the inter-device control information is not allowed, when the periodic based partial sensing is not completed.

9. The method of claim 1, wherein a resource reservation period field value of the inter-device control information is 0, when the periodic based partial sensing is not completed.

10. The method of claim 1, further comprising:

performing sensing for at least one sensing slot related to the at least one candidate slot; and excluding a resource with a reference signal received power greater than or equal to a threshold value from the candidate resource set, based on the performed sensing.

11. The method of claim 10, wherein the inter-device resource is selected within the candidate resource set from which the resource with the reference signal received power greater than or equal to the threshold value is excluded.

12. The method of claim 1, wherein the resource selection is related to a periodic transmission.

13. The method of claim 1, further comprising:

determining a resource selection window for the resource selection within the resource pool, wherein the candidate resource set is included within the resource selection window.

14. A first device comprising:

one or more processors;

one or more transceivers; and one or more memories connected to the one or more processors and storing instructions, wherein the instructions, based on being executed by the one or more processors, cause the first device to:

perform synchronization with a synchronization source;

obtain information related to a resource pool;

trigger resource selection for an inter-device physical control channel resource or an inter-device physical shared channel resource for transmitting a medium access control protocol data unit, within the resource pool;

determine at least one candidate slot for periodic based partial sensing related to the resource selection;

select an inter-device resource, based on a candidate resource set related to the at least one candidate slot; and transmit, to a second device, inter-device control information based on the inter-device resource, wherein the inter-device control information does not include information related to a reservation period of the medium access control medium access control, when the periodic based partial sensing related to a transmission period of the medium access control protocol data unit is not completed.

15. A processing device adapted to control a first device, the processing device comprising:

one or more processors; and one or more memories connected to the one or more processors and storing instructions, wherein the instructions, based on being executed by the one or more processors, cause the first device to:

perform synchronization with a synchronization source;

obtain information related to a resource pool;

trigger resource selection for an the instructions, based on being executed by resource or an inter-device physical shared a channel resource for transmitting a medium access control protocol data unit, within the resource pool;

determine at least one candidate slot for periodic based partial sensing related to the resource selection;

select an inter-device resource, based on a candidate resource set related to the at least one candidate slot; and transmit, to a second UE, inter-device control information based on the inter-device resource, wherein the inter-device control information does not include information related to a reservation period of the medium access control medium access control, when the periodic based partial sensing related to a transmission period of the medium access control protocol data unit is not completed.

* * * * *